United States Patent
Ikuta et al.

(10) Patent No.: US 12,433,560 B2
(45) Date of Patent: Oct. 7, 2025

(54) ARTIFACT-DRIVEN DATA SYNTHESIS IN COMPUTED TOMOGRAPHY

(71) Applicant: GE Precision Healthcare LLC, Wauwatosa, WI (US)

(72) Inventors: Masaki Ikuta, Pleasanton, CA (US); Junpyo Hong, San Ramon, CA (US); Rajesh Kumar Tamada, Bangalore (IN); Ravi Soni, San Ramon, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 350 days.

(21) Appl. No.: 17/937,152

(22) Filed: Sep. 30, 2022

(65) Prior Publication Data

US 2024/0108299 A1    Apr. 4, 2024

(51) Int. Cl.
*A61B 6/00*    (2024.01)
*G06T 7/00*    (2017.01)

(52) U.S. Cl.
CPC .......... *A61B 6/5258* (2013.01); *A61B 6/5235* (2013.01); *G06T 7/0012* (2013.01); *G06T 2207/10081* (2013.01)

(58) Field of Classification Search
CPC ......... G06T 7/0012; G06T 2207/10081; A61B 6/5258; A61B 6/5235; G05T 11/00
See application file for complete search history.

(56) References Cited

U.S. PATENT DOCUMENTS

2024/0135603 A1*   4/2024   Favazza ............... G06V 10/774

FOREIGN PATENT DOCUMENTS

WO    WO-2022174155 A1 *  8/2022  .......... G06T 11/005

OTHER PUBLICATIONS

Sakamoto, Mitsuki, et al. "Automated Segmentation of Hip and Thigh Muscles in Metal Artifact-Contaminated CT using Convolutional Neural Network-Enhanced Normalized Metal Artifact Reduction." arXiv preprint arXiv:1906.11484 (2019). (Year: 2019).*

Li, Hua, et al. "Clinical evaluation of a commercial orthopedic metal artifact reduction tool for CT simulations in radiation therapy." Medical physics 39.12 (2012): 7507-7517. (Year: 2012).*

(Continued)

*Primary Examiner* — Vu Le
*Assistant Examiner* — Tracy Mangialaschi
(74) *Attorney, Agent, or Firm* — Amin, Turocy & Watson, LLP

(57) ABSTRACT

Computer processing techniques are described for augmenting computed tomography (CT) images with synthetic artifacts for artificial intelligence (AI) applications. According to an example, a computer-implemented method can include generating, by a system comprising a processor, synthetic artifact data corresponding to one or more CT image artifacts, wherein the synthetic artifact data comprises anatomy agnostic synthetic representations of the one or more CT image artifacts. The method further includes generating, by the system, augmented CT images comprising the one or more CT image artifacts using the synthetic artifact data. In one or more examples, the method can further include training, by the system, a medical image inferencing model to perform an inferencing task using the augmented CT images as training images.

20 Claims, 14 Drawing Sheets

(56) References Cited

OTHER PUBLICATIONS

Taylor, L. et al. | "Improving Deep Learning using Generic Data Augmentation". Published Aug. 20, 2017 Computer Science, 2018 IEEE Symposium Series on Computational Intelligence (SSCI), https://www.semanticscholar.org/paper/Improving-Deep-Learning-with-Generic-Data-Taylor-Nitschke/27c495019bae2d7ab5b607e11a47a39cd9f1c519, 6 pages.

Andrews, G. | "What is Synthetic Data?". NVIDIA blog https://blogs.nvidia.com/blog/2021/06/08/what-is-synthetic-data/, publiahed Jun. 8, 2021, last accessed Aug. 16, 2022, 13 pages.

Eldridge, M. | "Human Body Unit Study". Pinterest page https://in.pinterest.com/pin/human-body-72-water-13159023884000652/, last accessed Aug. 16, 2022, 2 pages.

Rodriguez, V. | "Medical Images in python (Computed Tomography)". Webpage https://vincentblog.xyz/posts/medical-images-in-python-computed tomography, published Oct. 5, 2019; last accessed on Aug. 17, 2022, 19 pages.

Zeng, D. et al. | "A simple low-dose x-ray ct simulation from high-dose scan". IEEE Transactions on Nuclear Science, Oct. 2015; 62(5): 2226-2233, doi:10.1109/TNS.2015.2467219, 26 pages.

Zhang, Y. et al. | "Convolutional neural network based metal artifact reduction in X-ray computed tomography". IEEE Transactions on Medical Imaging, 37(6):1370-1381, Jun. 2018, 12 pages.

Zhang, Y. et al. | "CNN-MAR. Convolutional neural network based metal artifact reduction (CNN-MAR) in x-ray computed tomography". Webpage https://github.com/yanbozhang007/CNN-MAR, published Apr. 6, 2019, last accessed Aug. 17, 2022, 3 pages.

Sakamoto et al. | "Metal Artifact Simulation". Webpage https://github.com/NAIST-ICB/metal_artifact_simulation, published Jun. 25, 2019, last accessed Aug. 17, 2022, 4 pages.

Pelliccia, D. | "From filtered back-projection to statistical tomography reconstruction". Webpage https://www.slideshare.net/danielepelliccia/from-filtered-backprojection-to-statistical-tomography-reconstruction, published Sep. 1, 2018, 21 pages.

Humphries, Th., Dr. | "Superiorized Iterative Methods for Reconstruction of CT Images". Webpages https://depts.washington.edu/uwbur/uwb/superiorized-iterative-methods-for-reconstruction-of-ct-images/, published 2020, last accessed Aug. 19, 2022, 5 pages.

EP application 23198192.9 filed Sep. 19, 2023—Search Report issued Mar. 11, 2024; 9 pages.

Mitsuki Sakamoto et al: "Automated Segmentation of Hip and Thigh Muscles in Metal Artifact-Contaminated CT using Convolutional Neural Network-Enhanced Normalized Metal Artifact Reduction", arxiv.org, Cornell University Library, 201 Olin Library Cornell University Ithaca, NY 14853, Jun. 27, 2019 (Jun. 27, 2019), XP081384834, * p. 1 - p. 3 *.

* cited by examiner

EXAMPLE COMPUTED TOMOGRAPHY (CT) ARTIFACTS

| | | | | | |
|---|---|---|---|---|---|
| System Design | Aliasing | Partial volume | Scatter | Noise-induced streaks | Gaussian noise |
| X-Ray Tube Induced | Off-focal radiation | Tube arcing | Tube rotor wobble | Poisson noise | |
| Detector Induced | Offset, gain, etc. | Primary speed/ afterglow | Detector response uniformity | | |
| Patient Induced | Patient motion | Beam hardening | Metal artifacts | Incomplete projections | |
| Operator Induced | Patient motion | Incomplete projections | | | |
| Others | Head holder | Rotator table | | | |

FIG. 2

ARTIFACT-DRIVEN DATA SYNTHESIS IN COMPUTED TOMOGRAPHY

TECHNICAL FIELD

This application relates to medical image processing and more particularly to computer processing techniques for augmenting computed tomography (CT) images with synthetic artifacts.

BACKGROUND

Machine learning (ML) models are used in many medical image processing and analysis tasks like organ segmentation, anomaly detection, diagnosis classification, risk prediction, temporal analysis, image reconstruction, and so on. However, one of the fundamental problems in data-driven based machine learning approaches is that the final model inferencing capability is limited by the scope of the training data used to develop the model. With respect to the medical imaging sector, due to the nature of the data acquisition process, it can be difficult and costly to obtain enough medical images for model training that provide a comprehensive representation of the potential image variants across different patient populations.

DESCRIPTION OF THE DRAWINGS

FIG. 2 presents some example CT image artifacts in accordance with one or more embodiments of the disclosed subject matter.

DETAILED DESCRIPTION

Figure 1:
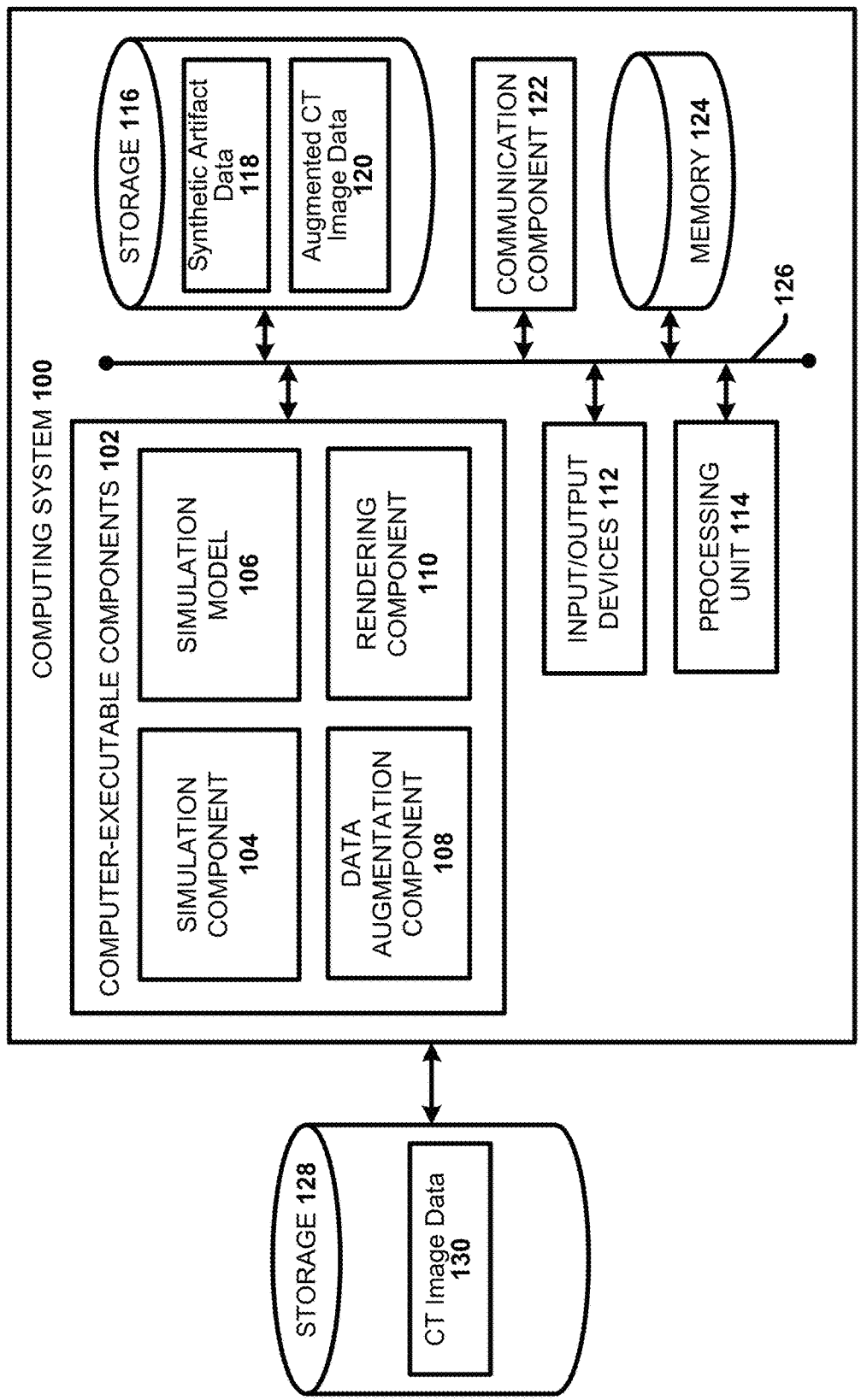
FIG. 1 illustrates an example computing system that facilities augmenting CT images with synthetic artifacts in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background section or in the Detailed Description section.

The disclosed subject matter is directed to systems, computer-implemented methods, apparatus and/or computer program products that provide computer processing techniques that facilitate artifact-driven data synthesis for computed tomography (CT) artificial intelligence (AI) applications. Synthetic imaging techniques have been used in the medical imaging domain to increase the amount and diversity of medical images used to train machine learning (ML) models, a process generally referred to as training data augmentation or simply data augmentation. As opposed to real medical image data obtained from direct measurements captured via a medical imaging acquisition system (e.g., a CT scanner), synthetic imaging techniques generate synthetic or artificially generated medical image data using rule-based schemes, statistical modeling, simulation and other techniques.

One or more embodiments of the disclosed subject matter are directed to synthesizing CT artifacts in association with employing the CT artifacts for data augmentation of CT image training datasets for CT AI/ML applications. The disclosed techniques identify a plurality of different types of CT image artifacts observed in real CT images and synthesize these artifacts independently. The synthesized artifacts are then combined with real CT images in different ways to generate augmented, synthetic CT images that can be used as additional training images to increase the variety of the training image datasets for CT AI/ML model development (i.e., artifact-driven data synthesis for CT AI applications). In this regard, there a many different types of artifacts observed in real CT images, such as metal objects, Poisson noise, Gaussian noise, streaks, scatter and several others. Many simulation methods have been developed to simulate artifacts in CT imaging. However, these simulations are usually conducted on real CT images for the purpose of developing artifact removal applications. As a result, the conventional CT artifact simulations have anatomical dependencies and patient dependencies, rendering them unusable for augmentation purposes.

The disclosed techniques employ a novel anatomy agnostic simulation method to simulate different CT artifacts within a simulation material having a low radiodensity value as opposed to an anatomical region of the body represented in real CT image data. As a result, the disclosed techniques can generate synthetic CT artifacts that are anatomically agnostic (e.g., not tied to any particular anatomical region of the body) and devoid of any patient dependencies. In various embodiments, the simulation material preferably has a Hounsfield unit (HU) value between about −200 and +200, more preferably between about −100 and +100, and even more preferably between about −50 and +50. In some embodiments, the simulation material comprises water, which has a HU value of zero. Other suitable simulation material can include but are not limited to, fat (e.g., having a HU value of about −50), human soft tissue (e.g., having a HU value of about +50), human blood (e.g., having a HU value of about +50), and similar materials. In some embodiments, the disclosed techniques further generate the synthetic CT artifacts in the sinogram domain as opposed to the image domain, which further enhances the realistic quality of the synthetic CT artifacts. In other embodiments, the synthetic CT artifacts can be generated in the image domain and/or the projection domain.

One or more embodiments of the disclosed subject matter are directed to synthesizing a plurality of different CT artifacts using the anatomy agnostic simulation method noted above. The different CT artifacts correspond to pre-generated synthetic representations of the different CT artifacts. One or more additional embodiments are directed to combining the pre-generated synthetic CT artifacts with CT images to generate augmented CT images respectively comprising one or more of the synthetic artifacts. One or more additional embodiments are further directed to employing the augmented CT images in association with training medical image inferencing models to perform one or more inferencing tasks with improved robustness against artifacts.

According to an embodiment, a system is provided that comprises a memory that stores computer-executable components, and a processor that executes the computer-executable components stored in the memory. The computer-executable components comprise a simulation component that generates synthetic artifact data corresponding to one or more CT image artifacts, wherein the simulation component generates the synthetic artifact data using an anatomy agnostic simulation model, resulting in the synthetic artifact data comprises one or more synthetic representations of the one or more CT image artifacts simulated within a simulation material having a low radiodensity value, rending the synthetic artifact data anatomy agnostic. In various embodiments, the simulation material preferably has a HU value between about −200 and +200, more preferably between about −100 and +100, and even more preferably between about −50 and +50. In some embodiments, the simulation material comprises water, which has a HU value of zero. Other suitable simulation material can include but are not limited to, fat (e.g., having a HU value of about −50), human soft tissue (e.g., having a HU value of about +50), human blood (e.g., having a HU value of about +50), and similar materials.

In one or more implementations, the simulation component generates the synthetic artifact data in the sinogram domain. In other implementations, the simulation component generates the synthetic artifact data in the projection domain. Still in other implementations, the simulation component generates the synthetic artifact data in the image domain.

The computer-executable components further comprise a data augmentation component that generates augmented CT images comprising the one or more computed tomography image artifacts using the synthetic artifact data. In this regard, the data augmentation component combines the synthetic artifact data with one or more CT images to generate the augmented computed tomography images. In some implementations, the data augmentation component aligns the one or more CT image artifacts with a target position on the one or more CT images using ground truth region of interest data associated with the one or more CT images. In various implementations, the one or more CT images comprise medical images corresponding to different anatomical regions. In this regard, because the synthetic artifact data is anatomy agnostic the data augmentation component can apply the corresponding artifacts to any CT scan image, regardless of the body part or body region scanned. The data augmentation component can also combine an artifact of the one or more CT image artifacts with respective copies of the same CT image at different positions or orientations in association with generating the augmented CT images.

In various implementations, the one or more CT image artifacts comprise a plurality of different types of artifacts. For example, the CT image artifacts can include (but are not limited to) one or more metal object artifacts, one or more Poisson noise artifacts (e.g., representing different levels of Poisson noise), and one or more Gaussian noise artifacts (e.g., representing different levels of Gaussian noise). Other types of CT image artifacts are also envisioned. In some implementations, the data augmentation component can also combine two or more artifacts of the plurality of the different types of artifacts with the same CT image in association with generating the augmented CT images.

In one or more implementations, the computer-executable components further comprise a training component that employs the augmented CT images as training images in association with training a medical image inferencing model to perform an inferencing task.

In some embodiments, elements described in the disclosed systems can be embodied in different forms such as a computer-implemented method, a computer program product, or another form.

The disclosed techniques provide numerous technical advantages. The disclosed techniques provide for efficiently augmenting CT image training data sets with increased variety in the form of CT images with artificially integrated artifacts that are synthetically generated and applied to CT images. The augmented training data sets including CT images without artifacts as well as additional CT images with synthetic artifacts significantly improve the robustness (e.g., accuracy, specificity, etc.) of medical image inferencing models against artifacts when trained using the augmented training data sets. In addition, owing to the fact that the synthetic CT artifacts are pre-generated, anatomy agnostic, and devoid of patient dependencies, the disclosed techniques enable rapid and efficient integration of different types of synthetic artifacts on any anatomical CT image and at different positions and orientations. Further, the disclosed techniques for generating the synthetic artifacts using an anatomy agnostic simulation model significantly reduces the processing speed and computational resources needed to generate different types of synthetic artifacts that are applicable to different anatomical CT images.

The terms "algorithm" and "model" are used herein interchangeably unless context warrants particular distinction amongst the terms. The terms "artificial intelligence (AI) model" and "machine learning (ML) model" are used herein interchangeably unless context warrants particular distinction amongst the terms.

The term "image inferencing model" is used herein to refer to an AI/ML model adapted to perform an image processing or analysis task on image data. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image inferencing models described herein can include two-dimensional (2D) image processing models as well as three-dimensional (3D) image processing models. The image processing model can employ various types of AI/ML algorithms, including (but not limited to): deep learning models, neural network models, deep neural network models (DNNs), convolutional neural network models (CNNs), generative adversarial neural network models (GANs) and the like. The terms "image inferencing model," "image processing model," "image analysis model," and the like are used herein interchangeably unless context warrants particular distinction amongst the terms.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output will vary based on the type of the model and the particular task that the model is configured to perform. The image-based inference output can include a data object that can be rendered (e.g., a visual data object), stored, used as input for another processing task, or the like. The terms "image-based inference output", "inference output" "inference result" "inference", "output", "predication", and the like, are used herein interchangeably unless context warrants particular distinction amongst the terms.

As used herein, a "medical imaging inferencing model" refers to an image inferencing model that is tailored to perform an image processing/analysis task on medical image data. For example, the medical imaging processing/analysis task can include (but is not limited to): disease/condition classification, disease region segmentation, organ segmentation, disease quantification, disease/condition staging, risk prediction, temporal analysis, anomaly detection, anatomical feature characterization, medical image reconstruction, and the like. The terms "medical image inferencing model," "medical image processing model," "medical image analysis model," and the like are used herein interchangeably unless context warrants particular distinction amongst the terms.

The term "image data," is used herein to refer to both digital images and the data used to generate the digital images (e.g., raw measurement data generated by the imaging acquisition system and associated metadata, simulated measurement data and associated metadata, sinogram data, etc.). As applied to the disclosed techniques, the term image data can include CT image data, synthetic CT image data, CT artifact data, synthetic CT artifact data, and augmented CT image data. The term "native" as applied to medical image data is used herein to refer to real medical image data obtained from direct measurements captured via a medical imaging acquisition system (e.g., a CT scanner). The term "synthetic" as applied to medical image data and more particularly to CT artifact data is used to refer to artificially generated medical image data generated using rule-based schemes, statistical modeling, simulation and other techniques.

Embodiments of systems and devices described herein can include one or more machine-executable (i.e., computer-executable) components or instructions embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described. These computer/machine executable components or instructions (and other described herein) can be stored in memory associated with the one or more machines. The memory can further be operatively coupled to at least one processor, such that the components can be executed by the at least one processor to perform the operations described. In some embodiments, the memory can include a non-transitory machine-readable storage medium, comprising the executable components or instructions that, when executed by a processor, facilitate performance of operations described for the respective executable components. Examples of said and memory and processor as well as other suitable computer or computing-based elements, can be found with reference to FIG. 14 (e.g., processing unit 1404 and system memory 1406 respectively), and can be used in connection with implementing one or more of the systems or components shown and described in connection with FIG. 1, or other figures disclosed herein.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

FIG. 1 illustrates an example computing system (hereinafter system 100) that facilities augmenting CT images with synthetic artifacts in accordance with one or more embodiments of the disclosed subject matter. System 100 includes computer-executable components 102, storage 116, communication component 122, input/output devices 112, processing unit 114 and memory 124. System 100 further includes a system bus 126 that couples the computer-executable components 112, the storage 116, the communication component 122, the input/output devices 112, the processing unit 114 and the memory 124 to one another. In some embodiments, computer-executable components 102 can be stored in memory 124 and executed by processing unit 114 to cause the system 100 to perform operations described with respect to the corresponding components. In this regard, the computing system 100 can correspond to any suitable computing device or machine (e.g., a communication device, a desktop computer, a personal computer, a smartphone, a server, a virtual computing device, etc.), or interconnected group of computing devices/machine (e.g., interconnected via wired and/or wireless communication technologies).

System 100 can be communicatively coupled (e.g., via any suitable wired and/or wireless communication technologies) to external storage 128 that can provide data to be processed by the system 100, including CT image data 130. In other embodiments, the CT image data 130 can be stored locally in storage 116 and/or memory 124. Storage 116 can store data that is generated by the system 100, including synthetic artifact data 118 and augmented CT image data 120. In this regard, storage 128 and storage 116 can correspond to any suitable machine-readable media that can be accessed by the computing system 100 and includes both volatile and non-volatile media, removable and non-removable media implemented in any method or technology for storage of information, such as computer-readable instructions, data structures, models, algorithms, program modules, or other data. Computer storage media can include, but is not limited to, random access memory (RAM), read only memory (ROM), erasable programmable read only memory (EPROM), flash memory or other memory technology, digital video disk (DVD) or other optical disk storage, magnetic cassettes, magnetic tape, magnetic disk storage or other magnetic storage devices, or any other medium which can be used to store the desired information and which can be accessed by the computing system 100.

The communication component 122 can correspond to any suitable communication technology hardware and/or software that can perform wired and/or wireless communication of data between the computing system 100 and other systems, devices and/or databases (e.g., storage 128). In this regard, the communication component 122 can provide for receiving data (e.g., CT image data 130) from one or more external systems and/or devices and communicating (e.g., sending, transmitting, etc.) data (e.g., synthetic artifact data 118, augmented CT image data 120, etc.) to one or more external systems and/or devices. Examples of suitable communication technology hardware and/or software employable by the communication component 122 are described infra with reference to FIG. 14. The input/output devices 112 can correspond to any suitable input and/or output device (e.g., a keyboard, a mouse, a touchscreen, a display, etc.) that provides for receiving user input in association with usage of the features and functionalities of the computing system 100 and displaying or rendering information (e.g., in a visual format via a display, as audio, etc.) to users. For example, in various embodiments, the input/output devices 112 can include any suitable display device and the rendering component 110 can render (e.g., display, present, etc.) any of the data received by the system 100 (e.g., CT image data 130) and/or generated by the system 100 (e.g., synthetic artifact data 118, augmented CT image data 120) via the display device. Additional examples of some suitable input/output devices 112 are also described with reference to FIG. 14 with respect to input device(s) 1428 and output device(s) 1436).

The computer-executable components 102 can simulation component 104, simulation model 106, data augmentation component 108 and rendering component 110.

The simulation component 104 can generate synthetic artifact data 118 corresponding to one or more CT image artifacts. There a many different types of artifacts observed in real or native CT images, such as metal objects, noise (e.g., Poisson noise, Gaussian noise, etc.), streaks, scatter and several others. FIG. 2 presents some example CT image artifacts in accordance with one or more embodiments of the disclosed subject matter. As shown in FIG. 2, CT image artifacts can include artifacts attributed to system design (e.g., design, model, make operating settings, etc., of the CT scanning and reconstruction system), X-ray tube induced, detector induced, patient induced, operator induced and others. The artifacts attributed one or more of these categories routinely appear in real CT images as visual image features in the form of noise, blur, streaks, objects, and other imaging characteristics. Due to the nature of the CT acquisition process and the various causes of CT artifacts the amount and diversity of different CT artifacts appearing in real CT images is high. Accordingly, the training data sets used to train and develop medical image inferencing models to perform clinical inferencing tasks on real CT images (for real patients) in the medical field should account for the wide range of potential CT artifacts that may observed. As noted in the Background section, it can be difficult and costly to obtain real CT image training datasets for ML/AI model training and development that account for the wide range of different artifacts that may be present in real patient images at runtime.

With reference to FIGS. 1-2, with this context in mind, the simulation component 104 can generate synthetic representations (e.g., synthetic artifact data 118) of the wide range of different CT artifacts indicated in FIG. 2. The data augmentation component 108 can further generate augmented CT images comprising one or more of the different CT artifacts using the synthetic representations. To facilitate this end, the simulation component 104 can employ a simulation model 106 to generate the synthetic artifact data 118. The simulation model 106 simulates capture of respective CT artifacts by a CT scanner within a simulation material having a low radiodensity value as opposed to an anatomical region of the body represented in real CT image data, such as a body of water as opposed to the human body. As a result, the simulation model 106 generates synthetic CT artifacts that are anatomically agnostic (e.g., not tied to any particular anatomical region of the body) and devoid of any patient dependencies, rendering the simulation model 106 an anatomy agnostic or anatomy independent simulation model In various embodiments, the simulation material preferably has a HU value between about −200 and +200, more preferably between about −100 and +100, and even more preferably between about −50 and +50. In some embodiments, the simulation material comprises water, which has a HU value of zero. Other suitable simulation material can include but are not limited to, fat (e.g., having a HU value of about −50), human soft tissue (e.g., having a HU value of about +50), human blood (e.g., having a HU value of about +50), and similar materials.

In this regard, CT scanners use a rotating X-ray (XR) tube and a row of detectors placed in the gantry to measure XR attenuations by different tissues inside the body. In accordance with conventional CT scanning procedures, the patient is centered on a motorized scanning table through a circular opening in the CT imaging system. As the patient passes through the CT imaging system via the motorized scanning table (e.g., incrementally forward or backward to generate different tube positions relative to the body of the patient), the XR tube providing a source of XRs rotates around the inside of the circular opening. The XR tube produces a narrow, fan-shaped beam of XR used to irradiate a section of the patient's body. In typical examinations there are several phases; each made up of 10 to 50 rotations of the XR tube around the patient in coordination with the table moving through the circular opening. Detectors on the exit side of the patient record the XR signals exiting the section of the patient's body being irradiated as an XR "snapshot" at one position (angle or view) of the XR tube. More particularly, the XR tube projects XR photons through the body of the patient and an array of detectors placed in the gantry on the opposite side of the body measure XR attenuations of the photons by different tissues inside the body based on the amount of photons arriving at the detector cells, referred to a projection signals or simply projections. Thus, each "snapshot" corresponding to each tube position can comprise a plurality of projections. The number of projections obtained for each tube position (e.g., each tube angle or view) depends on configuration of the detector cells, which can include an array of one or more rows and columns of cells. Many different "snapshots" (angles) are collected during one complete (e.g., 360°) rotation. The collection of projections captured during the scanning process is then sent to a computer to reconstruct all of the individual "snapshots" into a cross-sectional image (slice) of the internal organs and tissues for each complete rotation of the XR tube. In this regard, for conventional (e.g., non-helical) CT scanning procedures, the collection of signals (referred to herein as projections) captured at each tube position (e.g., angle or view) for a single rotation are then back projected to create the reconstructed image corresponding to a cross-sectional slice of the body for that rotation.

The projections are measured as a function of the Hounsfield unit (HU). The Hounsfield unit (HU) is a relative quantitative measurement of radio density used by radiologists in the interpretation of CT images. The absorption/attenuation coefficient of radiation within a tissue is used during CT reconstruction to produce a grayscale image. The physical density of tissue is proportional to the absorption/attenuation of the X-ray beam. The HU, also referred to as the CT unit, is then calculated based on a linear transformation of the baseline linear attenuation coefficient of the XR beam.

The simulation model 106 is rooted on the basis that water makes up about 72% of the human body tissues measured in CT, making water a good approximation medium of the human body for data science applications (e.g., training and developing AI models). In addition, the HU value of distilled water (at standard temperature and pressure) is arbitrarily defined to be zero. Accordingly, by using a simulation material of water or another material having a low CT value (e.g., fat, soft tissue, blood, etc.) the simulation model 106 simulates occurrence of CT artifacts in a background attenuation medium of zero (i.e., a blank canvas/background) or near zero (e.g., −50 to +50 for fat, soft tissue, blood and similar materials), rending the resulting synthetic CT artifact representations anatomically independent.

Figure 3A:
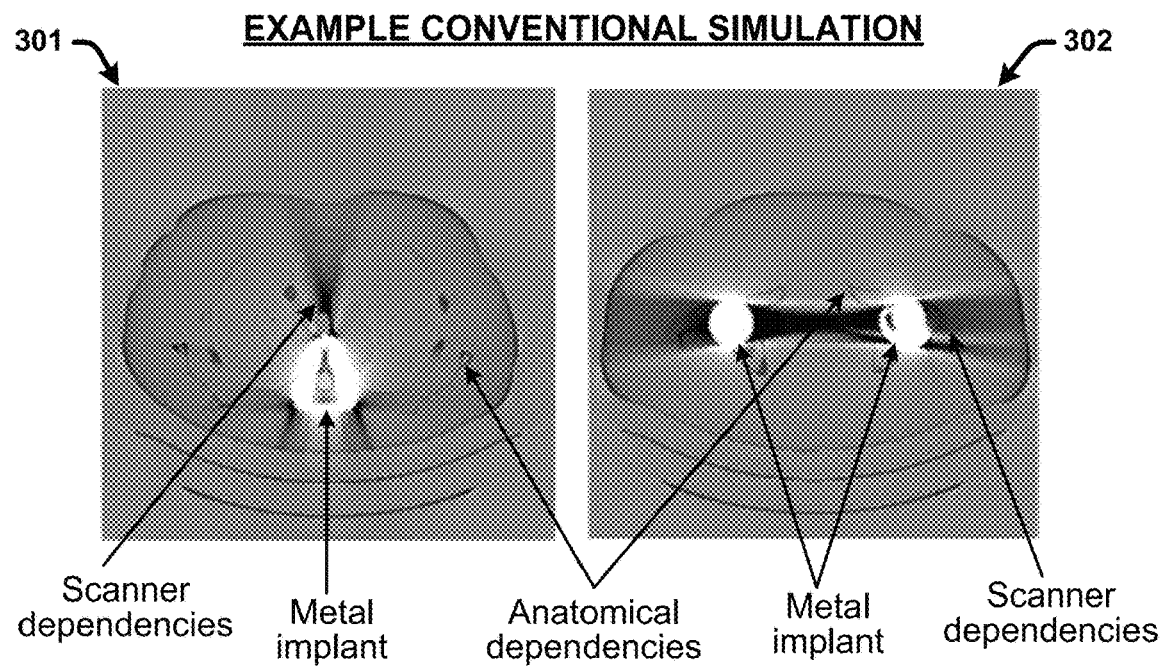
FIG. 3A illustrates example CT metal artifact simulations in accordance with a conventional simulation process.
Figure 3B:
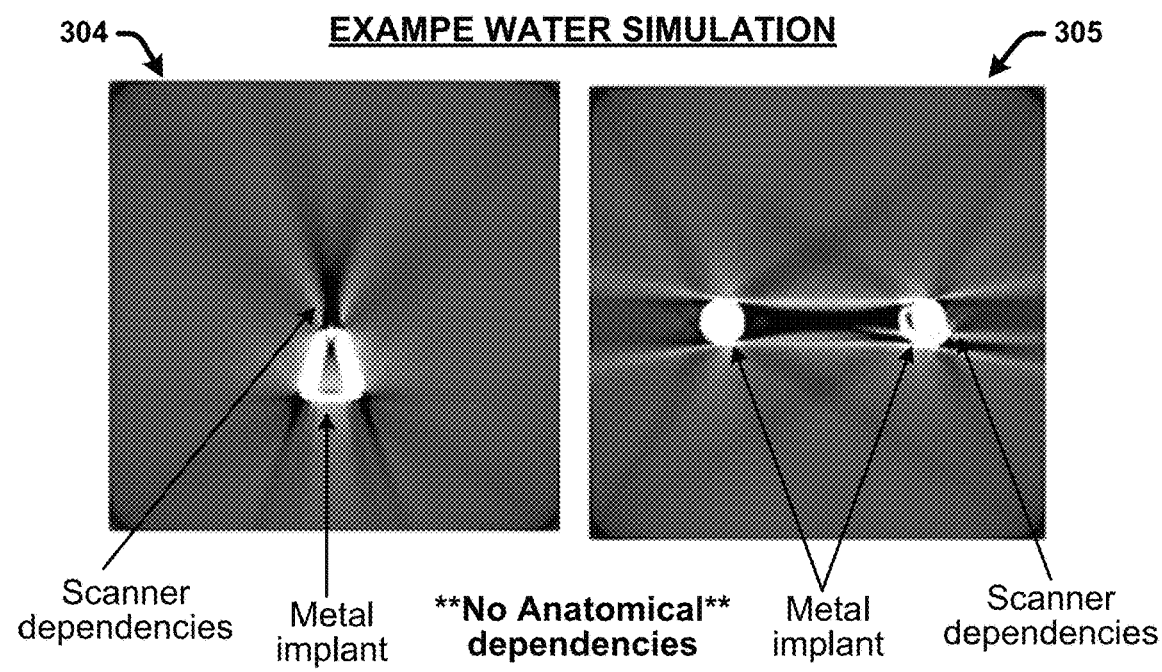
FIG. 3B illustrates example CT metal artifact simulations in accordance with the disclosed anatomy agnostic simulation process.

For example, FIG. 3A illustrates example CT metal artifact simulations in accordance with a conventional simulation process, and FIG. 3B illustrates corresponding example CT metal artifact simulations in accordance with the disclosed anatomy agnostic simulation process using a simulation material of water. As shown in FIG. 3A, conventional methods for simulating artifacts, such as metal implants in this example, are conducted on real CT images (i.e., CT image 301 and CT image 302). In this regard, CT image 301 and CT image 302 respectively correspond to real CT images of the femur with synthetically generated metal implants (depicted in white) embedded therein. As shown in FIG. 3A, as a result of simulating the metal implants on/within the real CT image data, the resulting metal artifacts have anatomical dependencies and patient dependencies. In particular, the visual appearance of the simulated metal implants is impacted or influenced by the contents (i.e., the projection values and corresponding pixel properties) of the CT images relative to which they are simulated. On the contrary, FIG. 3B presents artifact images 304 and 305 comprising the same metal implants illustrated in FIG. 3A yet generated using the simulation model 106. As illustrated in FIG. 3B, the artifact images 304 and 305 do not include any anatomical dependencies. In theory, one could conceivably attempt to extract the simulated metal implants from the real CT images in FIG. 3A using segmentation processing techniques to generate synthetic CT artifacts removed from the anatomical background data. However, the extracted artifacts will still have visual properties that are influenced by the background data in which they were originally created, rendering them inaccurate for the disclosed data augmentation purposes. In addition, conventional simulations of CT artifacts are tailored to specific anatomical datasets (e.g., brain, abdomen, chest, etc.) and computationally extensive (and expensive) to perform. Furthermore, and each type of artifact (e.g., metal implants, Poisson noise, etc.,) that has been simulated using existing simulation techniques requires a different simulation method.

With reference to FIGS. 1-3, in accordance with the disclosed techniques, the simulation component 104 can apply the same simulation model 106 to generate synthetic artifacts for a variety of different types of CT artifacts, including metal objects, Poisson noise, Gaussian noise, and various other represented in FIG. 2. In addition, because the artifacts are simulated relative to a simulation material having a low radiodensity value, such as water, fat, soft tissue, blood, and similar materials (e.g., with HU values −200 and +200, more preferably between about −100 and +100, and even more preferably between about −50 and +50), the synthetic artifacts do not have any patient dependencies or anatomical dependencies. As a result, the data augmentation component 108 can apply them to any type of CT image corresponding to any anatomical body region or body part (e.g., head, abdomen, chest, etc.).

In some embodiments, the simulation model 106 can generate the synthetic artifact data 118 in the image domain. Additionally, or alternatively, the simulation model 106 can generate the synthetic artifact data 118 in the sinogram domain and/or the projection domain as opposed to the image domain, which further enhances the realistic quality of the synthetic CT artifacts. The artifact images 304 and 305 illustrated in FIG. 3B depict the synthetic metal object artifacts rendered in the image domain, however it should be appreciated that may be simulated in the image domain, the sinogram domain and/or the projection domain. Any sinogram domain representation of a CT artifact can be converted to the image domain and/or the projection domain and vice versa using conventional CT reconstruction algorithms as discussed below.

In this regard, as discussed above, in accordance with the CT scanning procedure, a beam of XRs are made to pass through an anatomical slice of interest, and the resulting XRs are captured on a detector on the opposite side of the source as projection images comprising a plurality of projections respectively corresponding to an amount of photons absorbed by respective tissues in the body. The source-detector combination is made to rotate in a full circle around the object being imaged, so as to capture a large number of projection images. This constitutes the image acquisition aspect of CT. The CT sinogram domain or simply sinogram refers to the 2D array of data containing the projections for all of the projection images. Each reconstructed CT image has a corresponding sinogram representation corresponding to the 2D array of projection values captured/detected at the CT image slice perspective (i.e., position and orientation). In this regard, the image acquisition step is followed by a reconstruction step, where CT reconstruction algorithms (e.g., back-projection and filtered back-projection being a couple of them) are used to get back the anatomical details of the imaged slice using forward projection (or Radon Transform) and/or back-projection (or inverse Radon transform).

In this regard, reference to simulating artifacts in the sinogram domain refers to modeling the synthetic artifacts using projection data corresponding to simulated projection values (i.e., attenuation intensities) represented by the artifacts themselves with a background simulation material having a low radiodensity value (e.g., water, fat, soft tissue, blood and similar material). In various embodiments, using the simulation model 106 the simulation component 104 can generate synthetic sinogram representations of CT artifacts. The simulation component 104 can also convert the synthetic sinogram representations into grayscale images corresponding to synthetic CT images in the image domain using conventional CT reconstruction algorithms (e.g., back-projection and filtered back-projection). In this regard, the synthetic artifact data 118 can comprise a plurality of synthetic artifacts respectively corresponding to different CT artifacts, wherein each synthetic artifact can comprise a synthetic sinogram representation and an image domain representation computed or reconstructed from the sinogram representation. For example, the different synthetic artifacts can correspond to different types of objects (e.g., different types of implants observed in patients) and/or objects of different materials (e.g., different types of metals or another material). The different synthetic artifacts can also include noise artifacts corresponding to Poisson noise, Gaussian noise and/or different levels of noise (e.g., different levels of Poisson noise and/or Gaussian noise).

The data augmentation component 108 can further combine the synthetic artifact data 118 with CT image data (e.g., CT image data 130) to generate augmented CT image data 120. In this regard, the data augmentation component 108 can insert a synthetic artifact included in the synthetic artifact data 118 on or within a CT image included in the CT image data 130 to generate an augmented version of the CT image comprising the synthetic artifact. The types of the CT images represented in the CT image data 130 can vary and correspond to CT images representing any anatomical region of the body, include real CT images as well as synthetic CT images.

In some embodiments, the data augmentation component 108 can synthesize the augmented CT image in the sinogram domain. With these embodiments, the CT image data 130 can include sinogram representation of one or more CT images and/or the data augmentation component 108 can simulate the sinogram representations of the CT images using forward projection processing. With these embodiments, the data augmentation component 108 can combine a first sinogram representation of a CT image with a second sinogram representation of a synthetic artifact to generate a third fused sinogram representation of the augmented CT image comprising the artifact. The data augmentation component 108 can further convert the third fused sinogram representation into a grayscale CT image in the image domain for rendering. In other embodiments, the data augmentation component 108 can generate the augmented CT image data 120 in the image domain. With these embodiments, the data augmentation component 108 can combine a CT image included in the CT image data (i.e., in the image domain) with a synthetic artifact image included in the synthetic artifact data 118 (i.e., in the image domain) to generate an augmented CT image comprising the synthetic artifact. In some implementations of these embodiments, the data augmentation component 108 can apply the synthetic artifact image to the CT image as overlay data.

Figure 4:
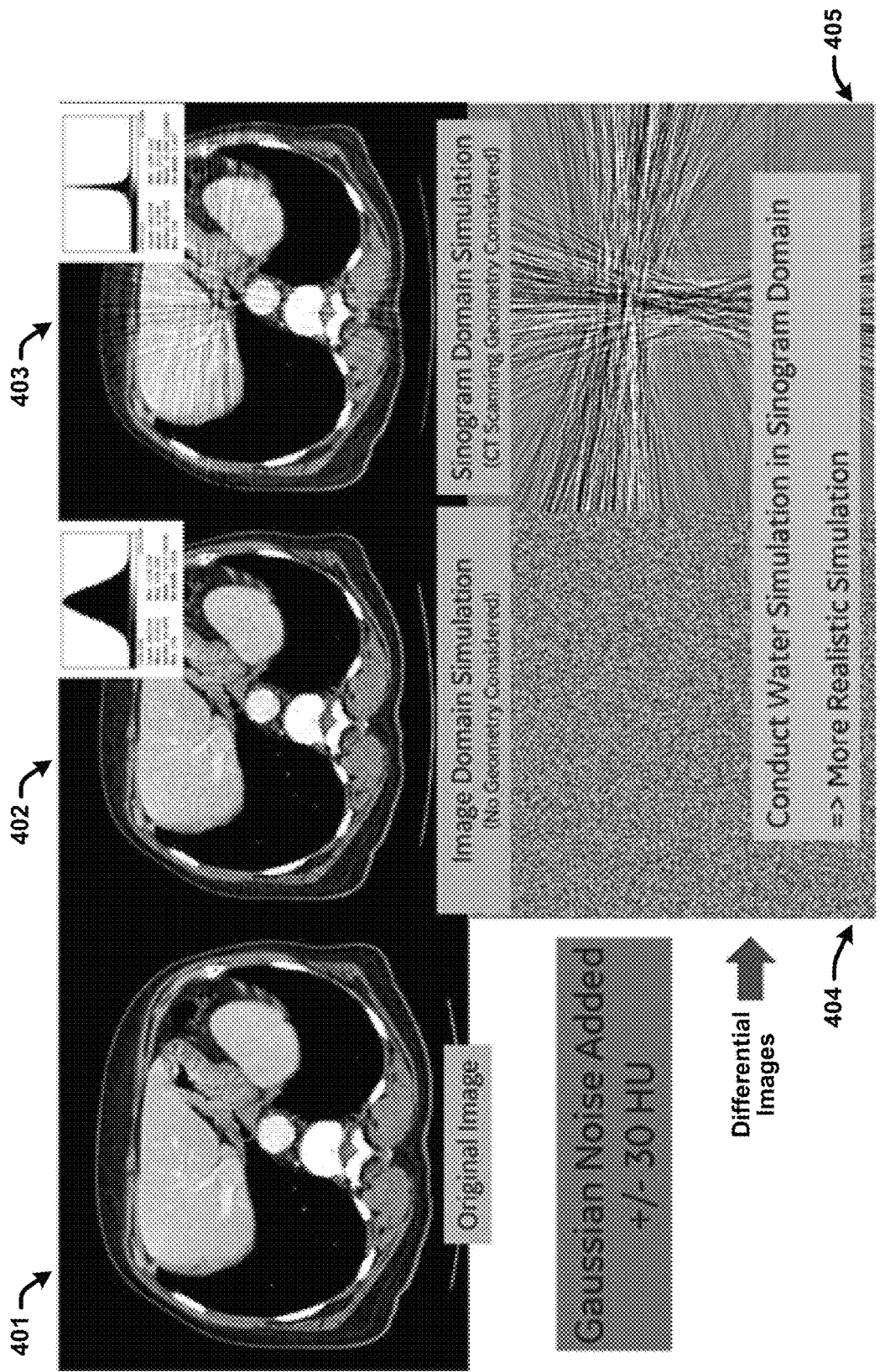
FIG. 4 illustrates an example Gaussian noise simulation in the CT image domain and the CT sinogram domain using the disclosed anatomy agnostic simulation process in accordance with one or more embodiments of the disclosed subject matter.

FIG. 4 illustrates an example Gaussian noise simulation in the CT image domain and the CT sinogram domain using the disclosed anatomy agnostic simulation process in accordance with one or more embodiments of the disclosed subject matter. Image 401 corresponds an original CT image depicting a cross-sectional region of the pelvis. Image 402 corresponds to a first augmented version of the original CT image 401 with a first synthetic representation of Gaussian noise added to the original CT image 401, wherein the first synthetic representation of Gaussian noise was simulated in the image domain using the simulation model 106. Image 404 corresponds to the differential image (e.g., image 402 minus image 401) depicting the added noise only. Image 403 corresponds to a second augmented version of the original CT image 401 with a second synthetic representation of Gaussian noise added to the original CT image 401, wherein the second synthetic representation of Gaussian noise was simulated in the sinogram domain using the simulation model 106. Image 405 corresponds to the differential image (e.g., image 404 minus image 401) depicting the added noise only. As can be observed by comparison of differential image 405 to differential image 404, and image 403 to image 402, the sinogram domain simulation results in a more realistic representation of Gaussian noise in CT, owing to the consideration of the CT scanning geometry required to compute the sinogram representation.

Figure 5:
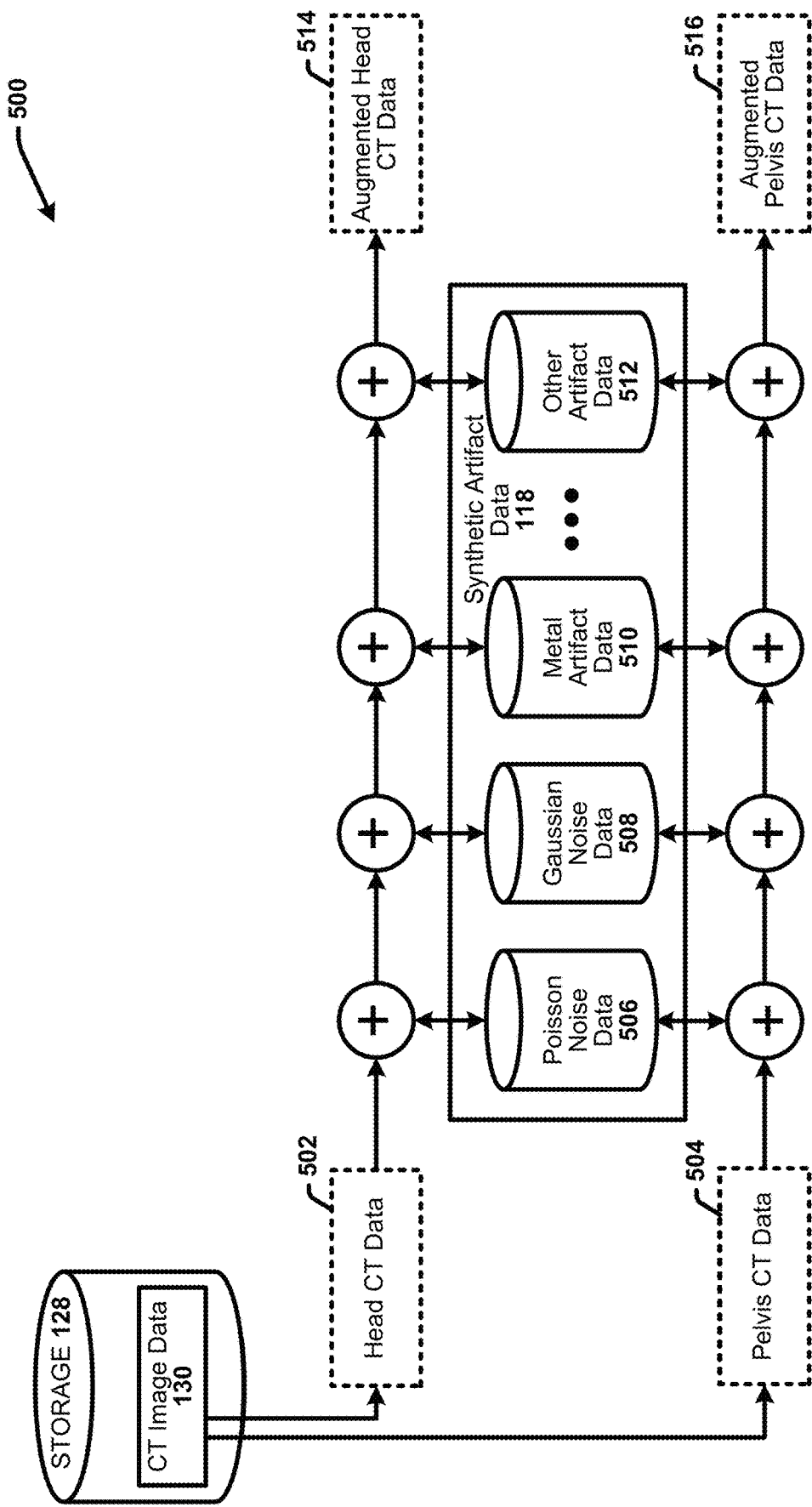
FIG. 5 illustrates an example workflow for generating augmented CT image data using pre-generated synthetic artifact data in accordance with one or more embodiments of the disclosed subject matter.

FIG. 5 illustrates an example workflow 500 for generating augmented CT image data (e.g., by the data augmentation component 108) using pre-generated synthetic artifact data in accordance with one or more embodiments of the disclosed subject matter. With reference to FIGS. 1-5, in various embodiments, the synthetic artifact data 118 can include or correspond to one or more collections of pre-generated synthetic CT artifacts (e.g., synthetic representations of CT artifacts in the sinogram domain, the projection domain and/or the image domain) generated by the simulation component 104 using the simulation model 106. For example, the synthetic artifact data 118 can include Poisson noise data 506 corresponding to different levels of Poisson noise artifacts (e.g., low, medium, high, very high, etc.), Gaussian noise data 508 corresponding to different levels of Gaussian noise artifacts (e.g., low, medium, high, very high, etc.), metal artifact data 510 corresponding to different types of metal objects and/or same object of different types of metal, and so on (e.g., wherein the other artifacts data 512 can correspond to one or more additional collections of synthetic artifacts of one or more additional types depicted in FIG. 2).

In accordance with the disclosed techniques, because the simulation component generates the synthetic artifact data 118 relative to a simulation material have a low radiodensity value (e.g., water, fat, soft tissue, blood and similar materials), the respective synthetic artifacts are anatomy agnostic. As a result, the data augmentation component 108 can apply any of the synthetic artifact to any type of CT image data corresponding to any anatomical region. For instance, in the embodiment shown, the workflow 500 involves processing head CT data 502 and pelvic CT data 504 included in the CT image data 130 with the same pre-generated synthetic artifact data 118 to generate the corresponding augmented versions thereof (e.g., augmented head CT data 514 and augmented pelvis CT data respectively). It should be appreciated that the head and pelvis CT data types are merely exemplary, and that the particular anatomical region depicted can include any anatomical region. In addition, the data augmentation component 108 can apply one or multiple (e.g., two or more) artifacts to the same CT image in association with generating the augmented CT image data 120. For example, the circular plus symbol icons above and below the respective synthetic artifact collections indicate additive functions that can be selectively activated (or not) by the data augmentation component 108 (and/or in response to user input) to selectively add an artifact from the corresponding collection to the corresponding CT data. In this regard, the augmented head CT data 514 can include a selected level of Poisson noise added, a selected level of Gaussian noise added, one or more selected metal artifacts and so on. Likewise, the augmented pelvis CT data 516 can include a selected level of Poisson noise added, a selected level of Gaussian noise added, one or more selected metal artifacts and so on. Furthermore, because the synthetic artifact data 118 can be pre-generated as it is not tied to a specific anatomy or CT image dataset, the data augmentation workflow 500 can be performed with fast processing speed in a computationally efficient manner.

Figure 6:
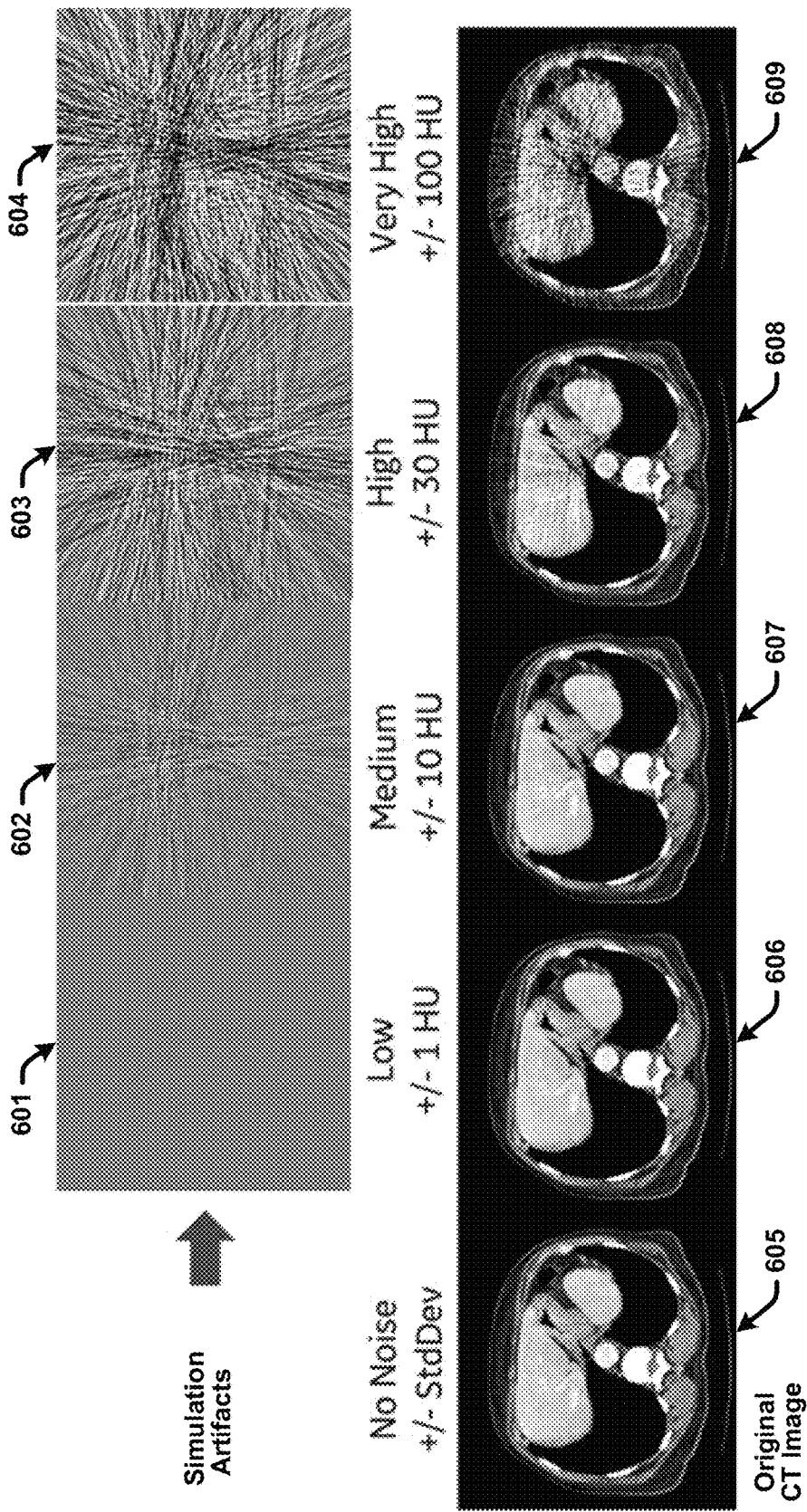
FIG. 6 illustrates an example CT image augmentation with Poisson noise in accordance with one or more embodiments of the disclosed subject matter.

FIG. 6 illustrates an example CT image augmentation with Poisson noise in accordance with one or more embodiments of the disclosed subject matter. With reference to FIGS. 1-6, sinogram images 601-604 respectively correspond to synthetic artifact representations of different levels (e.g., low, medium, high, and very high) of Poisson noise artifacts generated by the simulation component 104 in the sinogram domain using the water simulation model 104. In various embodiments, each of the synthetic artifact representations illustrated in sinogram images 601-604 can be included in the synthetic artifact data 118 (or more particularly the Poisson noise data 506 collection in FIG. 5) as candidate artifacts to apply to any CT image data for augmentation purposes. In the embodiments shown, the respective Poisson noise artifacts were added to a CT image of the pelvis (e.g., by the data augmentation component 106). Image 605 corresponds to the original CT image without any noise added. Image 606 depicts the original CT image 605 with the low Poisson noise artifact added (e.g., corresponding to sinogram image 601), image 607 depicts the original CT image 605 with the medium Poisson noise artifact added (e.g., corresponding to sinogram image 602), image 608 depicts the original CT image 605 with the high Poisson noise artifact added (e.g., corresponding to sinogram image 603), and image 609 depicts the original CT image 605 with the very high Poisson noise artifact added (e.g., corresponding to sinogram image 604). In this regard, each of the images 606-609 correspond to example augmented CT images that can be generated by the data augmentation component 108 using the synthetic artifact data 118 and included in the augmented CT image data 120.

Figure 7:
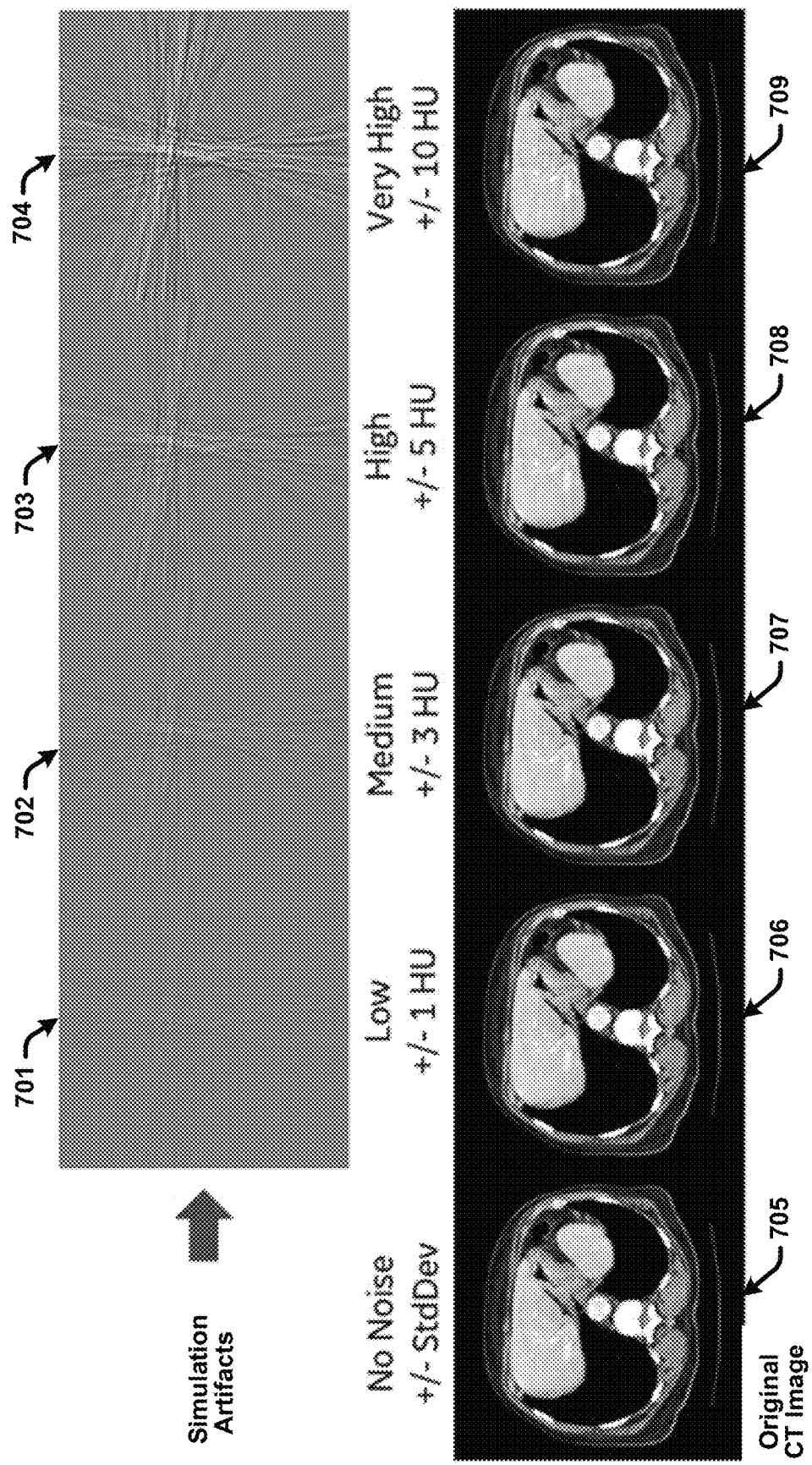
FIG. 7 illustrates an example CT image augmentation with Gaussian noise in accordance with one or more embodiments of the disclosed subject matter.

FIG. 7 illustrates an example CT image augmentation with Gaussian noise in accordance with one or more embodiments of the disclosed subject matter. With reference to FIGS. 1-5 and 7, sinogram images 701-704 respectively correspond to synthetic artifact representations of different levels (e.g., low, medium, high, and very high) of Gaussian noise artifacts generated by the simulation component 104 in the sinogram domain using the simulation model 106. In various embodiments, each of the synthetic artifact representations illustrated in sinogram images 701-704 can be included in the synthetic artifact data 118 (or more particularly the Gaussian noise data 508 collection in FIG. 5) as candidate artifacts to apply to any CT image data for augmentation purposes. In the embodiments shown, the respective Gaussian noise artifacts were added to a CT image of the pelvis (e.g., by the data augmentation component 108). Image 705 corresponds to the original CT image without any noise added. Image 706 depicts the original CT image 705 with the low Gaussian noise artifact added (e.g., corresponding to sinogram image 701), image 707 depicts the original CT image 705 with the medium Gaussian noise artifact added (e.g., corresponding to sinogram image 702), image 708 depicts the original CT image 705 with the high Gaussian noise artifact added (e.g., corresponding to sinogram image 703), and image 709 depicts the original CT image 705 with the very high Gaussian noise artifact added (e.g., corresponding to sinogram image 704). In this regard, each of the images 706-709 correspond to example augmented CT images that can be generated by the data augmentation component 108 using the synthetic artifact data 118 and included in the augmented CT image data 120.

Figure 8:
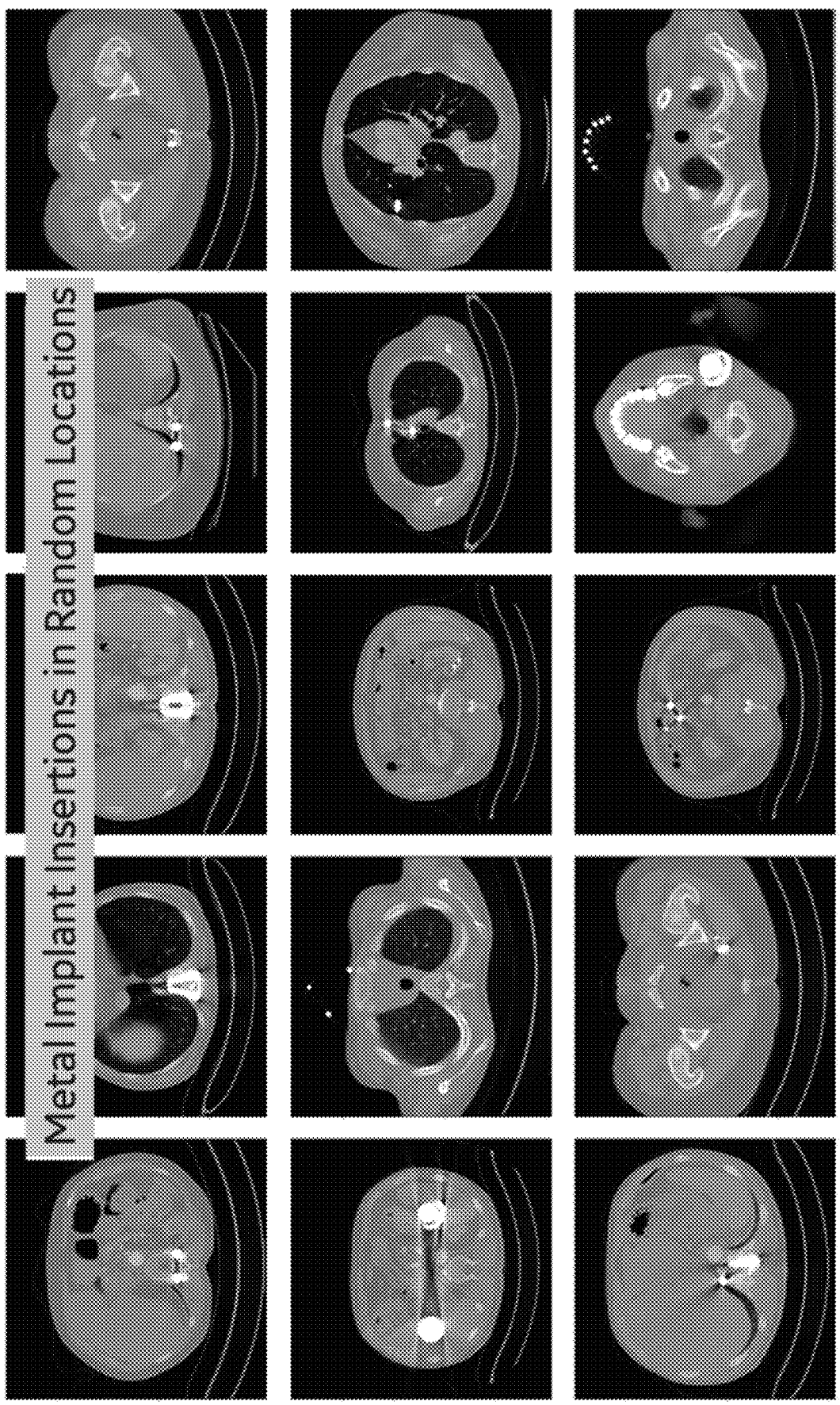
FIG. 8 illustrates example CT image augmentations with metal artifacts inserted randomly in accordance with one or more embodiments of the disclosed subject matter.

FIG. 8 illustrates example CT image augmentations with metal artifacts inserted randomly in accordance with one or more embodiments of the disclosed subject matter. FIG. 8 depicts a plurality of example augmented CT images comprising synthetic metal artifacts that were generated using the simulation model 106 and integrated on or within CT images by the data augmentation component 108. The augmented CT images shown in FIG. 8 correspond to additional example augmented CT images that can be generated by the data augmentation component 108 using the synthetic artifact data 118 (e.g., particularly metal object synthetic artifact data) and included in the augmented CT image data 120.

Each of the augmented CT images differ either with respect to the anatomical region depicted (e.g., which include different slices of the pelvis, abdomen and head), the type of metal object inserted and/or the position/orientation of the metal object inserted. The synthetic metal object artifacts in each image correspond to the white objects. As illustrated in FIG. 8, in some embodiments, the data augmentation component 108 can randomly insert (e.g., apply, combine with, add, etc.) synthetic metal artifacts on or within CT images in different positions and/or locations, regardless of the object type and the type of the CT images (i.e., the anatomical region depicted) to create an augmented set of CT images with artifact variations. Although some of the randomly augmented CT images may result in unnatural variants that may not be observed in clinical practice (e.g., see bottom right image with a metal dental implant outside the body and the middle image second column with the triangular metal dot configuration outside the body), integration of these random unnatural variants into training datasets for training medical image inferencing models has been shown to improve model robustness and accuracy.

In addition, in some embodiments, the data augmentation component 108 can employ ground truth (GT) label data associated with CT images to facilitate targeted positioning of synthetic artifacts in association with combing the artifacts with CT images at desired positions and/or orientations. In this regard, the data augmentation component 108 can align one or more CT image artifacts with a target position on one or more CT images using GT region of interest (ROI) data associated with the one or more CT images.

Figure 9:
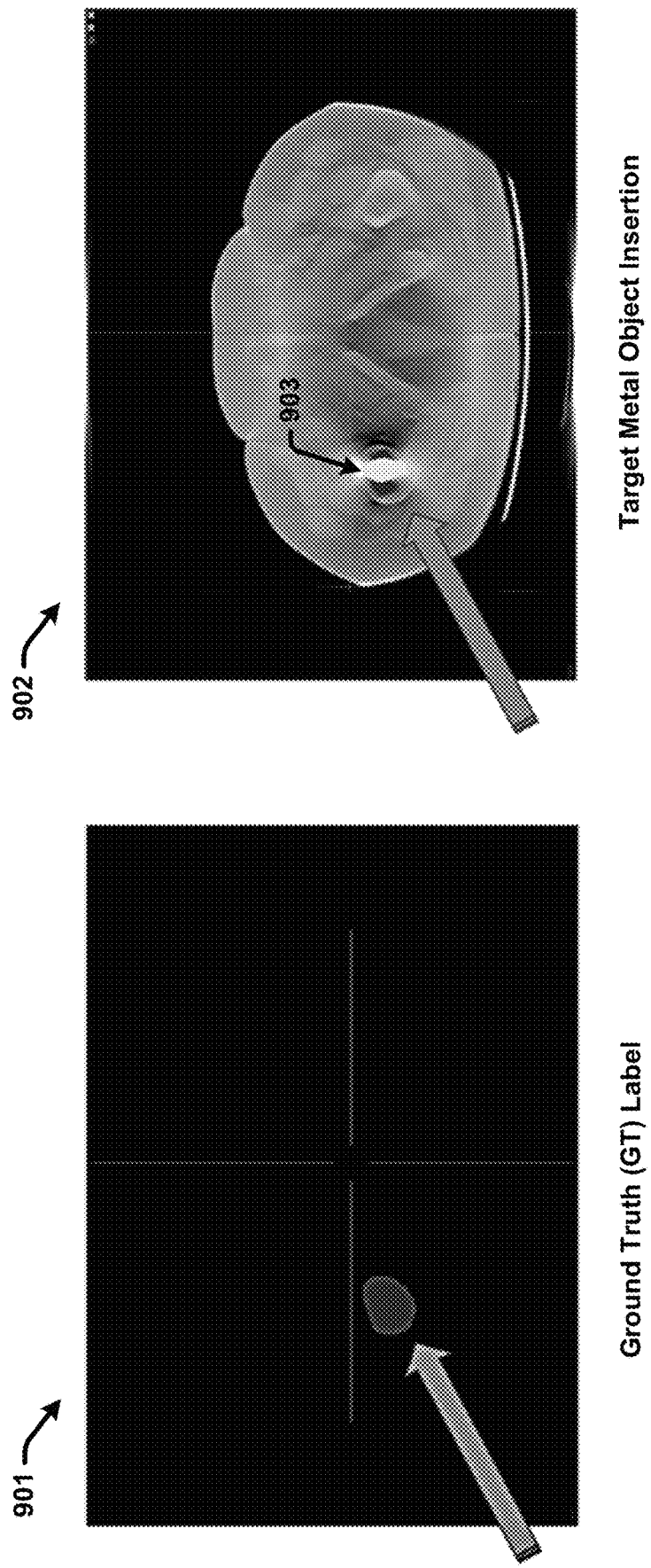
FIG. 9 illustrates targeted artifact integration in CT using ground truth labeling in accordance with one or more embodiments of the disclosed subject matter.

FIG. 9 illustrates targeted artifact integration in CT using ground truth labeling in accordance with one or more embodiments of the disclosed subject matter. With reference to FIGS. 1-9, image 901 depicts a ground truth (GT) label denoting a region of interest (ROI) associated with the corresponding CT image depicted in image 902. The GT label in this example is illustrated relative to a black background to indicate that the GT label data is separable from the underlying CT image data (e.g., as metadata or the like). For example, many medical image inferencing models employ training datasets annotated with GT labels in association with the supervised or semi-supervised machine learning training paradigms. One example of this includes the segmentation model training datasets which employ GT labels applied to target ROIs to be segmented by the segmentation model, such as organ segmentation models, lesion segmentation models, and the like. The GT labels are typically applied by medical experts in association with viewing the training CT images and applying manual mark-ups to the rendered CT images via a medical image annotation and view application. Once applied, the position and geometry of the GT labels relative to the corresponding image data can be calculated in 2D and/or 3D. can be decoupled from the underlying image while serving as a relational guide to indicate the target ROI for segmentation or the like. In the example shown in FIG. 9, the target RIO marks the position of a femur bone for segmentation. In general, these GT labels indicate positions and/or objects of relevance to the inferencing task of the model to be trained. Accordingly, these positions and/or objects correspond to significant positions where the presence of artifacts has been shown to negatively influence the accuracy and specificity of the model, making it more difficult for the model to discern between discrepancies created by the artifacts. In this regard, incorporating augmented training images with synthetic artifacts inserted at or near the GT labeled positions can significantly improve the model's robustness against artifacts. In the example shown in FIG. 9, the GT label marking the relative position of the femur bone in the corresponding CT image shown in image 902 was used as a positional guide to insert (e.g., by the data augmentation component 108) a synthetic metal object 903 at the target RIO (e.g., a hip prosthetic where the patient is expected to have a femur bone). Thus, in some embodiments in which the CT image data to be augmented (e.g., included in CT image data 130) includes or is otherwise associated with GT labeling indicating one or more ROIs, the data augmentation component 108 can employ the GT labels as guides to align and position one or more synthetic artifacts relative to the GT labels.

Figure 10:
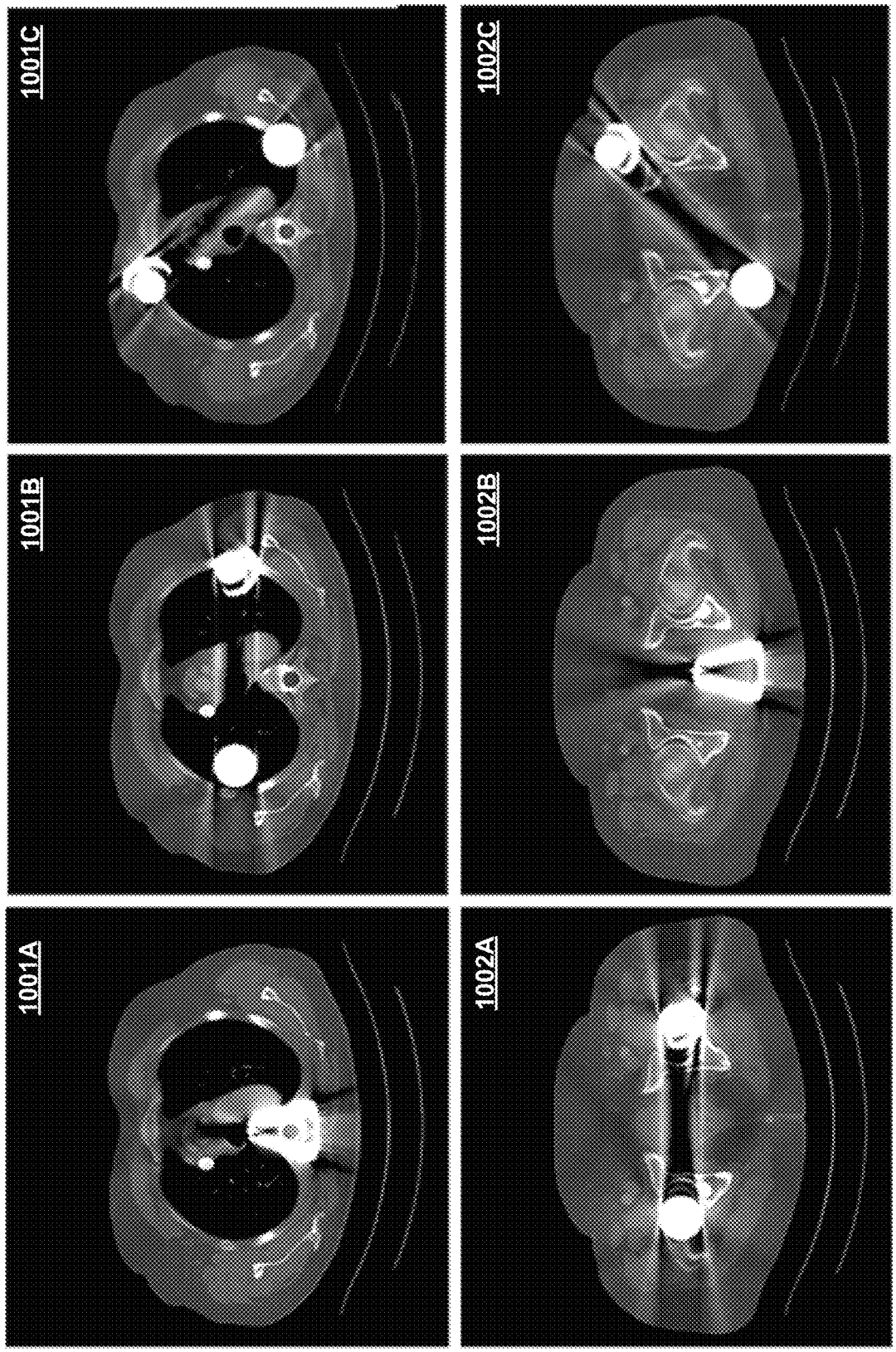
FIG. 10 illustrates some example metal artifact CT image augmentation operations facilitated by the data augmentation component in accordance with one or more embodiments of the disclosed subject matter.

FIG. 10 illustrates some example metal artifact CT image augmentation operations facilitated by the data augmentation component in accordance with one or more embodiments of the disclosed subject matter. With reference to FIGS. 1-10, as noted above, because the synthetic artifact data 118 is anatomy agnostic and pre-generated, the data augmentation component 108 can easily and efficiently apply one or more of the corresponding synthetic CT artifacts included therein to any CT image regardless of the anatomy depicted. In addition, the data augmentation component 108 can increase the variety of the augmented CT images by adjusting the position, orientation, and/or size (among other image manipulation techniques) of the synthetic artifacts. In this regard, the data augmentation component 108 can combine the same synthetic artifact with respective copies of the same CT image yet integrating the artifact at different positions, orientations, and/or with different sizes in the respective copies in association with generating augmented CT images.

For example, FIG. 10 illustrates metal object artifact swapping and rotating operations facilitated by the data augmentation component 108. Images 1001A, 1001B and 1001C respectively correspond to different augmented versions of a first CT image and images 1002A, 1002B and 1002C respectively correspond to different augmented versions of a second CT image. In particular, with reference again to FIGS. 3A and 3B, in view of FIG. 10, image 1001A corresponds to a version of CT image 301 generated in accordance with the disclosed anatomy agnostic simulation techniques as opposed to the conventional simulation techniques. In this regard, image 1001A incorporates the simulated version of the metal artifact shown in image 304 onto the native CT image corresponding to image 301. Similarly, image 1002A corresponds to a version of CT image 302 generated in accordance with the disclosed anatomy agnostic simulation techniques as opposed to the conventional simulation techniques. In this regard, image 1002A incorporates the simulated version of the metal artifact shown in image 305 onto the native CT image corresponding to image 302. As can be seen by comparison of image 1001A and 1002A to the conventional simulation images 301 and 302 respectively, the disclosed anatomy agnostic artifact simulation and data augmentation techniques produce a much more realistic and higher quality augmented CT image compared to conventional simulation techniques. In addition, because the metal artifacts are simulated independently of an actual CT image, the metal artifacts can be easily swapped, rotated, resized and so on to add more variety for data augmentation purposes. For example, in images 1001B and 1002B, the respective metal artifacts depicted in images 1001A and 1002B have been swapped. In another example, image 1001C depicts a version of image 1001B with the metal artifact (corresponding to the pair of white circles) being rotated counterclockwise about 100 degrees relative to the anatomy depicted. In another example, image 1002C depicts a version of image 1002A with the metal artifact (corresponding to the pair of white circles) being rotated counter-clockwise about 20 degrees relative to the anatomy depicted.

Figure 11:
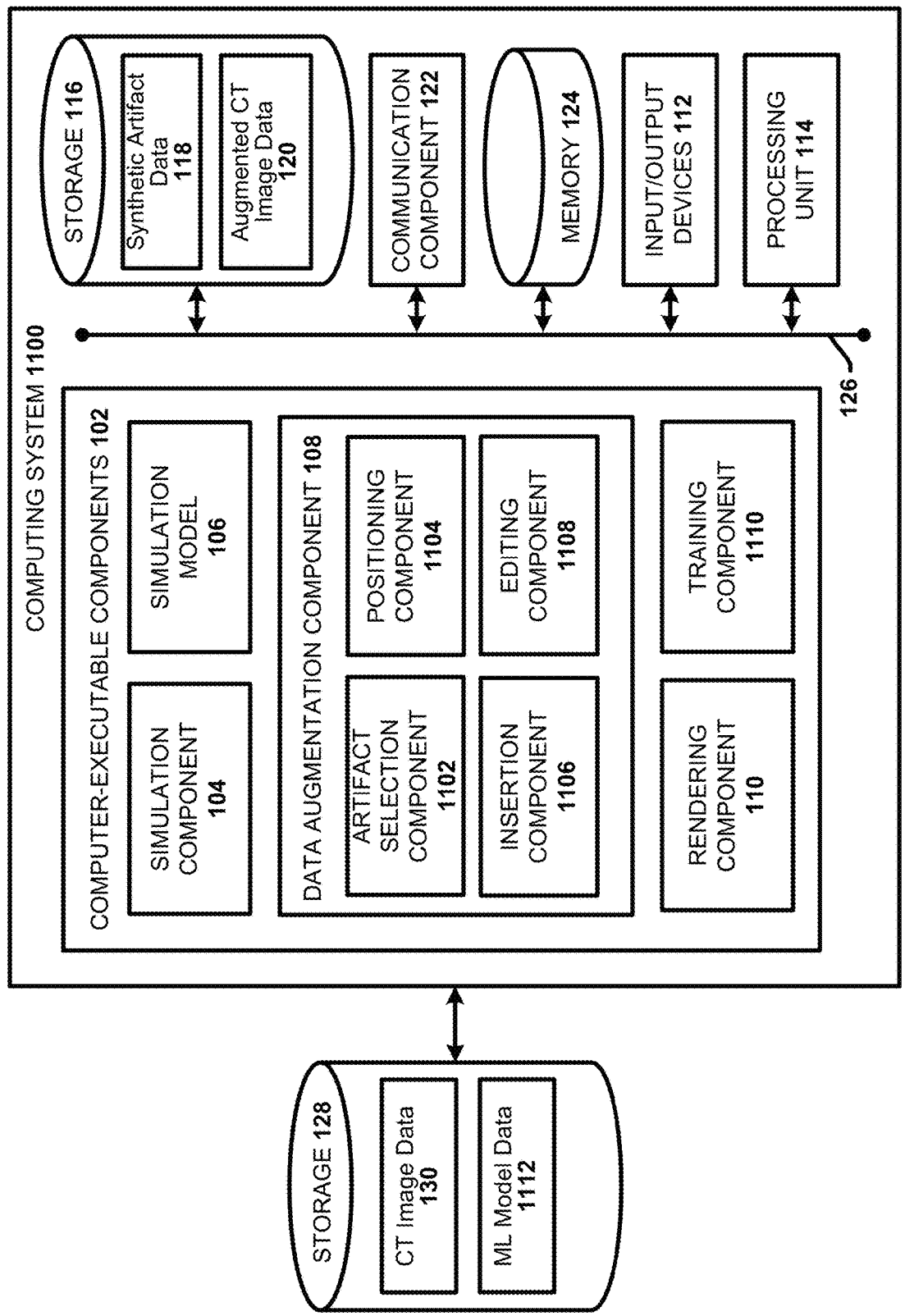
FIG. 11 presents an example computing system that facilities augmenting CT images with synthetic artifacts and employing the augmented CT images for training medical image inferencing models in accordance with one or more embodiments of the disclosed subject matter.

FIG. 11 presents an example computing system 1100 (hereinafter system 1100) that facilities augmenting CT images with synthetic artifacts and employing the augmented CT images for training medical image inferencing models in accordance with one or more embodiments of the disclosed subject matter. System 1100 is similar to system 100 with the addition of some specific sub-components to the data augmentation component 108, (including artifact selection component 1102, positioning component 1104, insertion component 1106 and editing component 1108), training component 1110 and ML model data 1112 to the external storage 128. Repetitive description of like elements employed in respective embodiments is omitted for sake of brevity.

In various embodiments, the artifact selection component 1102 can facilitate selecting specific pre-generated synthetic artifacts included in the synthetic artifact data 118 to add to one or more CT images (e.g., included in the CT image data 112) as described with reference to FIG. 5. In this regard, in some embodiments, one or more features and functionalities of the data augmentation component 108 can be implemented a user facing training data augmentation tool (e.g., in the form of a local software application/program, a web-application, a mobile application or the like) via which users (e.g., experts, ML model developers, clinicians, etc.) can review and augment training datasets for ML model training and/or other AI applications. With these embodiments, the rendering component 110 can present the users with a suitable graphical user interface that provides for selecting CT images and/or training datasets to augment, selecting and/or controlling artifact augmentation parameters regarding which synthetic artifacts to integrate into the some or all of the training images and where, and reviewing the augmented CT image results. The positioning component 1104 can provide positioning control tools that allow the user to perform operations controlling the positioning of the synthetic artifacts in the CT images, including swapping operations, rotating operations, resizing operations, and so on. The positioning component 1104 can further perform the targeted artifact insertion using corresponding GT labels as discussed above with reference to FIG. 9. The editing component 1108 can provide additional editing operations relative to the augmented CT images, such as various fine-tuning editing operations and other post-processing operations. The insertion component 1106 can perform any operations related to adding, inserting, overlaying and/or otherwise combing synthetic representations of artifacts included in the synthetic artifact data 118 on or within CT image data 112 (e.g., in the sinogram domain and/or the image domain) to generate the augmented CT image data 120.

The training component 1110 can further employ the augmented CT image data 120 in association with training one or more ML models corresponding to one or more medical image inferencing models. In this regard, in various embodiments the augmented CT image data 120 can include or otherwise be associated with training data sets including both native CT images and augmented CT images comprising one or more synthetic artifacts applied by the data augmentation component 108 in accordance with the disclosed techniques. The training component 1110 can further train and develop the ML models using the training data sets in accordance with various suitable machine learning processes (e.g., supervised training, unsupervised training, semi-supervised training, and the like) and protocols (e.g., training, testing and validation phases).

Figure 12:
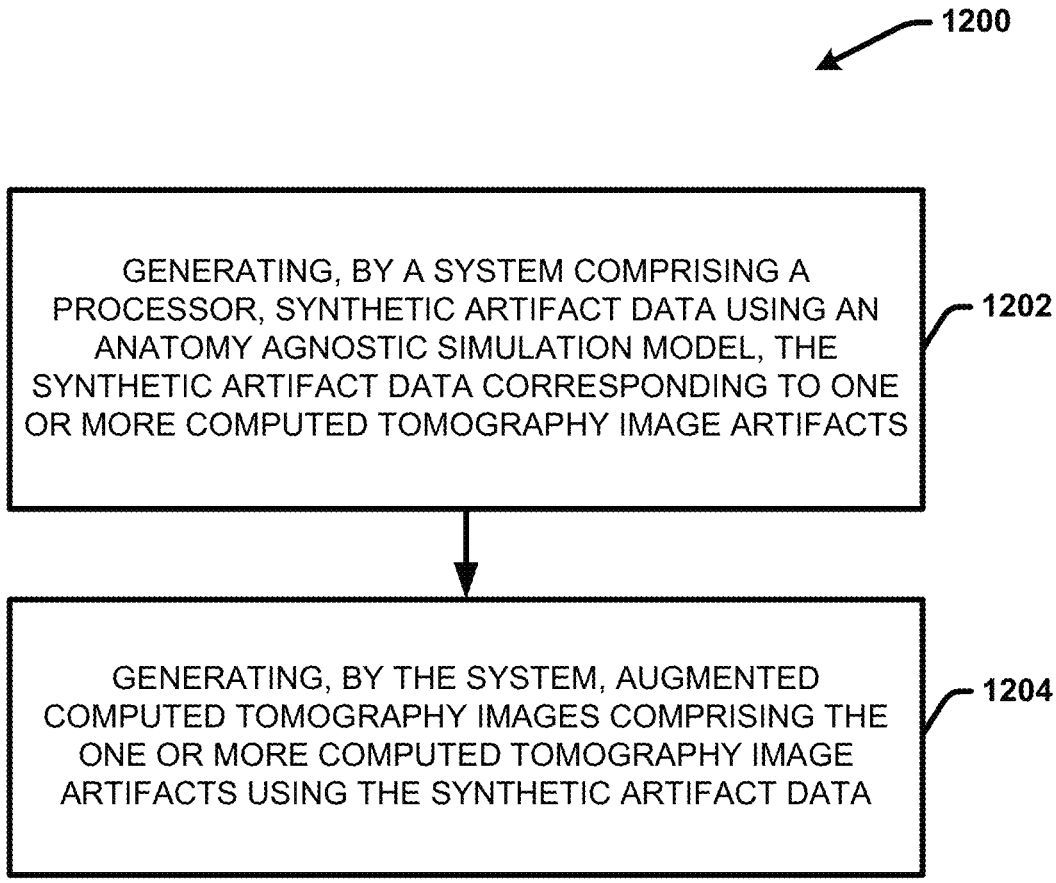
FIG. 12 illustrates a block diagram of an example, non-limiting computer implemented method for generating augmented CT images comprising synthetic artifacts in accordance with one or more embodiments of the disclosed subject matter.

FIG. 12 illustrates a block diagram of an example, non-limiting computer implemented method 1200 for generating augmented CT images comprising synthetic artifacts in accordance with one or more embodiments of the disclosed subject matter. Repetitive description of like elements employed in respective embodiment is omitted for sake of brevity.

Method 1200 comprises, at 1202, generating (e.g., via simulation component 104), by a system comprising a processor (e.g., computing system 100 or computing system 1100), synthetic artifact data (e.g., synthetic artifact data 118) using an anatomy agnostic simulation model (e.g., simulation model 106), the synthetic artifact data corresponding to one or more CT image artifacts. At 1204, method 1200 further comprises generating, by the system, augmented CT images (e.g., augmented CT image data 120) comprising the one or more computed tomography image artifacts using the synthetic artifact data (e.g., via data augmentation component 108). In some implementations, method 1200 can further comprise rendering or displaying the augmented CT images via a display associated with the computing system 100 and/or sending (e.g., transmitting via a wired or wireless communication network) the augmented CT images to a remote display device.

Figure 13:
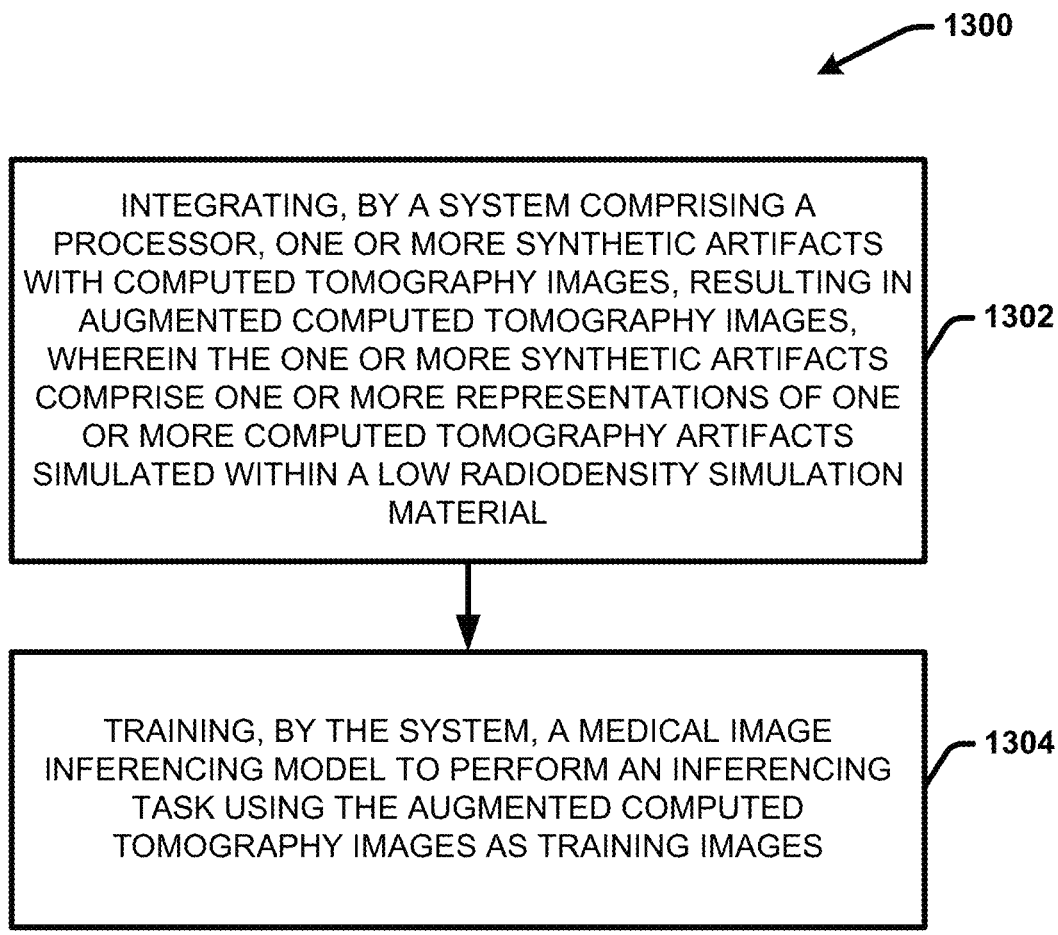
FIG. 13 illustrates a block diagram of an example, non-limiting computer implemented method for developing a medical image inferencing model with artifact robustness in accordance with one or more embodiments of the disclosed subject matter.

FIG. 13 illustrates a block diagram of an example, non-limiting computer implemented method 1300 for developing a medical image inferencing model with artifact robustness in accordance with one or more embodiments of the disclosed subject matter. Repetitive description of like elements employed in respective embodiment is omitted for sake of brevity.

Method 1300 comprises, at 1302 integrating (e.g., via data augmentation component 108), by a system comprising a processor (e.g., computing system 1100), one or more synthetic artifacts with CT mages, resulting in augmented CT images, wherein the one or more synthetic artifacts comprise one or more representations of one or more CT artifacts simulated within a simulation material having a low radiodensity (e.g., water, fat, soft tissue, blood, or a similar material). At 1304, method 1300 further comprises training, by the system (e.g., via training component 1110), a medical image inferencing model to perform an inferencing task using the augmented CT images as training images. In various embodiments, the training images can include the augmented CT images (e.g., with synthetic artifacts) as well as CT images without synthetic artifacts, which can correspond to the original CT images pre-augmentation and/or additional CT images. As a result of incorporating the augmented CT images into the training set, the resulting trained model has improved robustness (e.g., accuracy and/or specificity) against CT images with artifacts as compared to a version of model trained without the augmented CT images.

In this regard, the efficacy of the disclosed techniques was tested and validated in association with improving the robustness of a CT femur left and right femur segmentation bone model. In this experiment, a training dataset comprising a plurality of different CT images of the femur bone labeled with GT ROI data was augmented with different synthetic artifacts generated using the simulation model 106 in the sinogram domain. The synthetic artifacts included synthetic metal objects inserted with targeted positioning at or near the femur bone, as illustrated with reference to FIG. 9. The synthetic artifacts also include different levels and combinations of Poisson noise and Gaussian noise artifacts. The resulting training dataset included both augmented images (e.g., with synthetic artifacts generated using the disclosed techniques) and native CT images. The training, testing and validation phases were conducted using both the augmented images and the native images. The segmentation model performance results on the augmented CT images with Poisson noise, Gaussian noise and metal artifacts demonstrated improved model performance as a result of the integration of the augmented CT data.

One or more embodiments can be a system, a method, and/or a computer program product at any possible technical detail level of integration. The computer program product can include a computer readable storage medium (or media) having computer readable program instructions thereon for causing a processor to carry out one or more aspects of the present embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the entity's computer, partly on the entity's computer, as a stand-alone software package, partly on the entity's computer and partly on a remote computer or entirely on the remote computer or server. In the latter scenario, the remote computer can be connected to the entity's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 14, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 14:
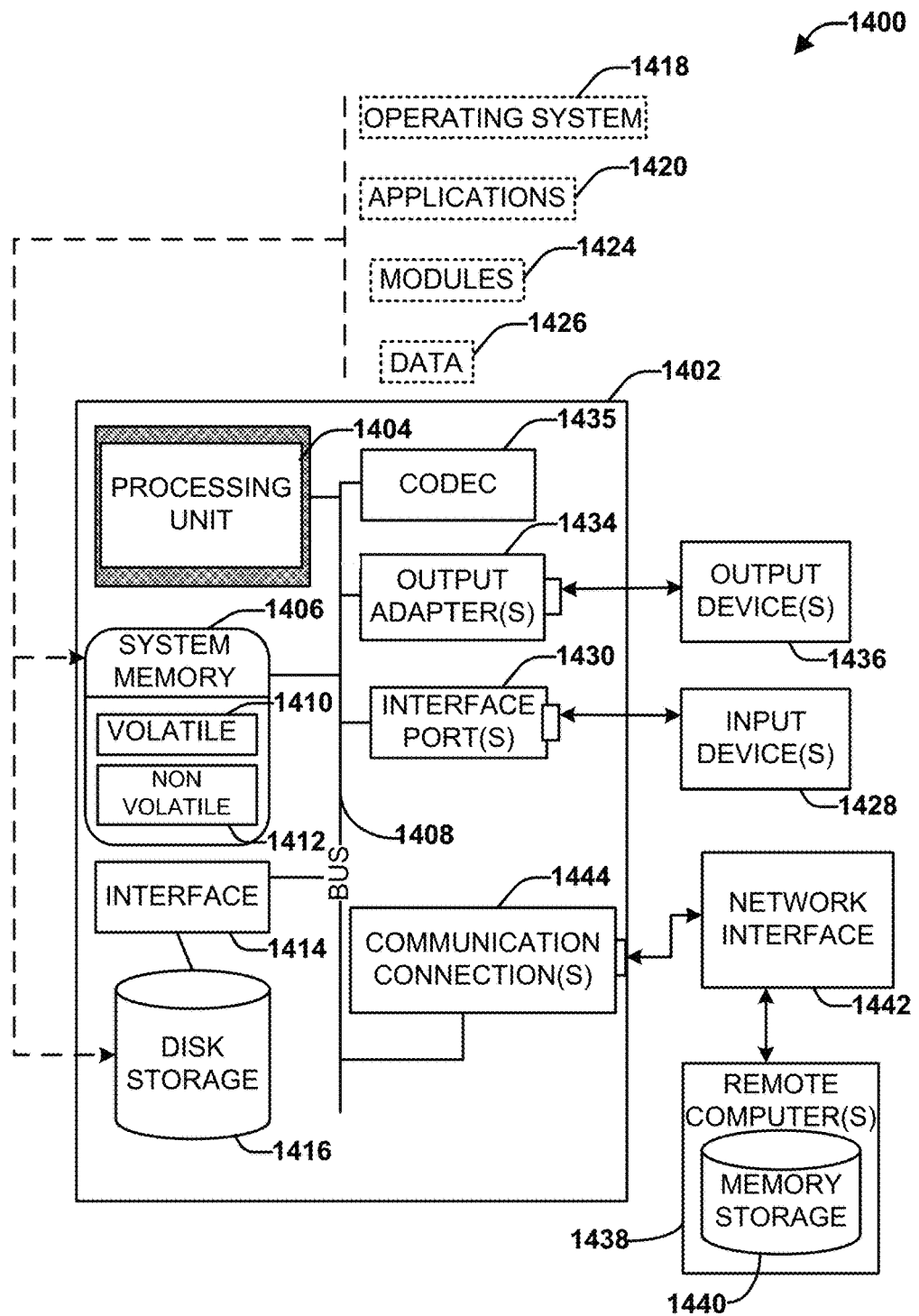
FIG. 14 illustrates a block diagram of an example, non-limiting operating environment in which one or more embodiments described herein can be facilitated.

With reference to FIG. 14, an example environment 1400 for implementing various aspects of the claimed subject matter includes a computer 1402. The computer 1402 includes a processing unit 1404, a system memory 1406, a codec 1435, and a system bus 1408. The system bus 1408 couples system components including, but not limited to, the system memory 1406 to the processing unit 1404. The processing unit 1404 can be any of various available processors. Dual microprocessors and other multiprocessor architectures also can be employed as the processing unit 1404.

The system bus 1408 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 13144), and Small Computer Systems Interface (SCSI).

The system memory 1406 includes volatile memory 1410 and non-volatile memory 1412, which can employ one or more of the disclosed memory architectures, in various embodiments. The basic input/output system (BIOS), containing the basic routines to transfer information between elements within the computer 1402, such as during start-up, is stored in non-volatile memory 1412. In addition, according to present innovations, codec 1435 can include at least one of an encoder or decoder, wherein the at least one of an encoder or decoder can consist of hardware, software, or a combination of hardware and software. Although, codec 1435 is depicted as a separate component, codec 1435 can be contained within non-volatile memory 1412. By way of illustration, and not limitation, non-volatile memory 1412 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 1412 can employ one or more of the disclosed memory devices, in at least some embodiments. Moreover, non-volatile memory 1412 can be computer memory (e.g., physically integrated with computer 1402 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 1410 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 1402 can also include removable/non-removable, volatile/non-volatile computer storage medium. FIG. 14 illustrates, for example, disk storage 1416. Disk storage 1416 includes, but is not limited to, devices such as a magnetic disk drive, solid state disk (SSD), flash memory card, or memory stick. In addition, disk storage 1416 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1416 to the system bus 1408, a removable or non-removable interface is typically used, such as interface 1414. It is appreciated that disk storage 1416 can store information related to an entity. Such information might be stored at or provided to a server or to an application running on an entity device. In one embodiment, the entity can be notified (e.g., by way of output device(s) 1436) of the types of information that are stored to disk storage 1416 or transmitted to the server or application. The entity can be provided the opportunity to opt-in or opt-out of having such information collected or shared with the server or application (e.g., by way of input from input device(s) 1428).

It is to be appreciated that FIG. 14 describes software that acts as an intermediary between entities and the basic computer resources described in the suitable operating environment 1400. Such software includes an operating system 1418. Operating system 1418, which can be stored on disk storage 1416, acts to control and allocate resources of the computer system 1402. Applications 1420 take advantage of the management of resources by operating system 1418 through program modules 1424, and program data 1426, such as the boot/shutdown transaction table and the like, stored either in system memory 1406 or on disk storage 1416. It is to be appreciated that the claimed subject matter can be implemented with various operating systems or combinations of operating systems.

An entity enters commands or information into the computer 1402 through input device(s) 1428. Input devices 1428 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1404 through the system bus 1408 via interface port(s) 1430. Interface port(s) 1430 include, for example, a serial port, a parallel port, a game port, and a universal serial bus (USB). Output device(s) 1436 use some of the same type of ports as input device(s) 1428. Thus, for example, a USB port can be used to provide input to computer 1402 and to output information from computer 1402 to an output device 1436. Output adapter 1434 is provided to illustrate that there are some output devices 1436 such as monitors, speakers, and printers, among other output devices 1436, which require special adapters. The output adapters 1434 include, by way of illustration and not limitation, video and sound cards that provide a means of connection between the output device 1436 and the system bus 1408. It should be noted that other devices or systems of devices provide both input and output capabilities such as remote computer(s) 1438.

Computer 1402 can operate in a networked environment using logical connections to one or more remote computers, such as remote computer(s) 1438. The remote computer(s) 1438 can be a personal computer, a server, a router, a network PC, a workstation, a microprocessor based appliance, a peer device, a smart phone, a tablet, or other network node, and typically includes many of the elements described relative to computer 1402. For purposes of brevity, only a memory storage device 1440 is illustrated with remote computer(s) 1438. Remote computer(s) 1438 is logically connected to computer 1402 through a network interface 1442 and then connected via communication connection(s) 1444. Network interface 1442 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1444 refers to the hardware/software employed to connect the network interface 1442 to the bus 1408. While communication connection 1444 is shown for illustrative clarity inside computer 1402, it can also be external to computer 1402. The hardware/software necessary for connection to the network interface 1442 includes, for exemplary purposes only, internal and external technologies such as, modems including regular telephone grade modems, cable modems and DSL modems, ISDN adapters, and wired and wireless Ethernet cards, hubs, and routers.

The illustrated aspects of the disclosure may also be practiced in distributed computing environments where certain tasks are performed by remote processing devices that are linked through a communications network. In a distributed computing environment, program modules can be located in both local and remote memory storage devices.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "subsystem" "platform," "layer," "gateway," "interface," "service," "application," "device," and the like, can refer to and/or can include one or more computer-related entities or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of entity equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
 a memory that stores computer-executable components; and
 a processor that executes the computer-executable components stored in the memory, wherein the computer-executable components comprise:
  a simulation component that generates synthetic artifact data corresponding to different computed tomography image artifacts, wherein the different computed tomography image artifacts comprise one or more metal object artifacts and one or more noise artifacts, wherein the simulation component generates the synthetic artifact data using an anatomy agnostic simulation model, and wherein the synthetic artifact data comprises synthetic representations of the different computed tomography image artifacts simulated within a simulation material selected from the group consisting of: a water material, a fat material, a soft tissue material, and a blood material; and
  a data augmentation component that combines the synthetic representations with computed tomography images to generate different augmented computed tomography images respectively depicting one or more of the different computed tomography image artifacts.

2. The system of claim 1, wherein the synthetic representations comprise sinogram representations of the different computed tomography image artifacts.

3. The system of claim 2, wherein the sinogram representations represent simulated attenuation intensities of the different computed tomography image artifacts within the simulation material.

4. The system of claim 1, wherein the data augmentation component aligns the synthetic representations with a target position on the computed tomography images using ground truth region of interest data associated with the computed tomography images.

5. The system of claim 1, wherein the data augmentation component combines a synthetic representation of the synthetic representations with different computed tomography images to generate the different augmented computed tomography images.

6. The system of claim 1, wherein the different augmented computed tomography images comprise different versions of a same computed tomography image, wherein the different versions respectively depict one or more different artifacts of the different computed tomography image artifacts within the same computed tomography image.

7. The system of claim 1, wherein the different augmented computed tomography images comprise different versions of a same computed tomography image, wherein the different versions respectively depict an artifact of the different computed tomography image artifacts at different positions or orientations within the same computed tomography image.

8. The system of claim 1, wherein the different augmented computed tomography images comprise at least some images depicting a metal object artifact and at least some images depicting a noise artifact.

9. The system of claim 1, wherein the one or more noise artifacts comprise a Poisson noise artifact and a Gaussian noise artifact.

10. The system of claim 1, wherein the computed tomography images comprise images captured of different anatomical regions.

11. The system of claim 1, wherein the computer-executable components further comprise:
 a training component that employs the different augmented computed tomography images as training images in association with training a medical image inferencing model to perform an inferencing task.

12. A method, comprising:
 generating, by a system comprising a processor, synthetic artifact data corresponding to different computed tomography image artifacts, wherein the different computed tomography image artifacts comprise one or more metal object artifacts and one or more noise artifacts, wherein the synthetic artifact data comprises synthetic representations of the different more computed tomography image artifacts simulated within a simulation material selected from the group consisting of: a water material, a fat material, a soft tissue material, and a blood material; and
 combining, by the system, the synthetic representations with computed tomography images to generate different augmented computed tomography images respectively depicting one or more of the different computed tomography image artifacts.

13. The method of claim 12, wherein the synthetic representations comprise sinogram representations of the different computed tomography image artifacts.

14. The method of claim 12, wherein the different computed tomography images comprise images captured of different anatomical regions.

15. The method of claim 12, wherein the different augmented computed tomography images comprise different versions of a same computed tomography image, wherein the different versions respectively depict one or more different artifacts of the different computed tomography image artifacts within the same computed tomography image.

16. The method of claim 12, wherein the different augmented computed tomography images comprise different versions of a same computed tomography image, wherein the different versions respectively depict an artifact of the different computed tomography image artifacts at different positions or orientations within the same computed tomography image.

17. The method of claim 12, wherein the different augmented computed tomography images comprise at least some images depicting a metal object artifact and at least some images depicting a noise artifact.

18. The method of claim 12, wherein the one or more noise artifacts comprise a Poisson noise artifact and a Gaussian noise artifact.

19. The method of claim 12, wherein the different computed tomography image artifacts comprise different levels Poisson noise artifacts and Gaussian noise artifacts.

20. A non-transitory machine-readable storage medium, comprising executable instructions that, when executed by a processor, facilitate performance of operations, comprising:
 generating synthetic artifact data using an anatomy agnostic simulation model, the synthetic artifact data corresponding to different computed tomography image artifacts, wherein the different computed tomography image artifacts comprise one or more metal object artifacts and one or more noise artifacts, wherein the synthetic artifact data comprises synthetic representations of the different computed tomography image artifacts simulated within a simulation material selected from the group consisting of: a water material, a fat material, a soft tissue material, and a blood material; and combining the synthetic representations with computed tomography images to generate different augmented computed tomography images respectively depicting one or more of the different computed tomography image artifacts.

* * * * *